US011010139B2

(12) United States Patent
Zabel et al.

(10) Patent No.: US 11,010,139 B2
(45) **Date of Patent: *May 18, 2021**

(54) APPLICATION DEVELOPMENT USING MULTIPLE PRIMARY USER INTERFACES

(71) Applicant: Hand Held Products, Inc., Fort Mill, SC (US)

(72) Inventors: Shawn Zabel, Fort Mill, SC (US); Jeffrey Pike, Murrysville, PA (US); Brian Bender, Jeanette, PA (US); Dennis Doubleday, Pittsburgh, PA (US); Mark D. Murawski, Pittsburgh, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,349

(22) Filed: Aug. 9, 2018

(65) Prior Publication Data

US 2018/0373503 A1 Dec. 27, 2018

Related U.S. Application Data

(63) Continuation of application No. 14/987,809, filed on Jan. 5, 2016, now Pat. No. 10,061,565.

(Continued)

(51) Int. Cl.

*G06F 9/44* (2018.01)
*G06F 8/34* (2018.01)

(Continued)

(52) U.S. Cl.

CPC .................. *G06F 8/34* (2013.01); *G06F 8/35* (2013.01); *G06Q 10/06* (2013.01)

(58) Field of Classification Search

CPC .............. G06F 8/34; G06F 8/35; G06Q 10/06

(Continued)

(56) References Cited

U.S. PATENT DOCUMENTS 6,832,725 B2 12/2004 Gardiner et al.
6,996,800 B2 2/2006 Lucassen et al.

(Continued)

FOREIGN PATENT DOCUMENTS

WO 2013/163789 A1 11/2013
WO 2013/173985 A1 11/2013

(Continued)

OTHER PUBLICATIONS

Bonnie et al., "Bringing Usability Concerns to the Design of Software Architecture", 2005, IFIP International Federation for Information Processing 2005, 19 pages (Year: 2005).*

(Continued)

*Primary Examiner* — Ted T. Vo
(74) *Attorney, Agent, or Firm* — Alston & Bird LLP

(57) ABSTRACT

Generally discussed herein are techniques, software, apparatuses, and systems configured for application development for an application using multiple primary user interfaces. In one or more embodiments, a method can include receiving data indicating a plurality of workflow activities to be used in an application, each of the workflow activities including data corresponding to a configuration of a view model module and a list of views to be associated with the configuration, receiving data indicating a plurality of primary user interface views to associate with each of the workflow activities, receiving data indicating a connection between two of the workflow activities of the plurality of workflow activities, and producing an application model based on the received data indicating the plurality of workflow activities, the data indicates the connection between (Continued)

two of the workflow activities and the data indicating the plurality of primary user interface views.

19 Claims, 15 Drawing Sheets

Related U.S. Application Data

(60) Provisional application No. 62/101,203, filed on Jan. 8, 2015.

(51) Int. Cl.
*G06F 8/35* (2018.01)
*G06Q 10/06* (2012.01)

(58) Field of Classification Search
USPC .................................................. 717/104–113
See application file for complete search history.

(56) References Cited

U.S. PATENT DOCUMENTS 7,128,266 B2 10/2006 Zhu et al.
7,159,783 B2 1/2007 Walczyk et al.
7,413,127 B2 8/2008 Ehrhart et al.
7,726,575 B2 6/2010 Wang et al.
7,900,186 B2 * 3/2011 Lucassen .................. G06F 8/38 717/104
8,294,969 B2 10/2012 Plesko
8,317,105 B2 11/2012 Kotlarsky et al.
8,322,622 B2 12/2012 Liu
8,366,005 B2 2/2013 Kotlarsky et al.
8,371,507 B2 2/2013 Haggerty et al.
8,376,233 B2 2/2013 Horn et al.
8,381,979 B2 2/2013 Franz
8,390,909 B2 3/2013 Plesko
8,408,464 B2 4/2013 Zhu et al.
8,408,468 B2 4/2013 Van et al.
8,408,469 B2 4/2013 Good
8,424,768 B2 4/2013 Rueblinger et al.
8,448,863 B2 5/2013 Xian et al.
8,457,013 B2 6/2013 Essinger et al.
8,459,557 B2 6/2013 Havens et al.
8,469,272 B2 6/2013 Kearney
8,474,712 B2 7/2013 Kearney et al.
8,479,992 B2 7/2013 Kotlarsky et al.
8,490,877 B2 7/2013 Kearney
8,517,271 B2 8/2013 Kotlarsky et al.
8,523,076 B2 9/2013 Good
8,528,818 B2 9/2013 Ehrhart et al.
8,544,737 B2 10/2013 Gomez et al.
8,548,420 B2 10/2013 Grunow et al.
8,550,335 B2 10/2013 Samek et al.
8,550,354 B2 10/2013 Gannon et al.
8,550,357 B2 10/2013 Kearney
8,556,174 B2 10/2013 Kosecki et al.
8,556,176 B2 10/2013 Van et al.
8,556,177 B2 10/2013 Hussey et al.
8,559,767 B2 10/2013 Barber et al.
8,561,895 B2 10/2013 Gomez et al.
8,561,903 B2 10/2013 Sauerwein, Jr.
8,561,905 B2 10/2013 Edmonds et al.
8,565,107 B2 10/2013 Pease et al.
8,571,307 B2 10/2013 Li et al.
8,579,200 B2 11/2013 Samek et al.
8,583,924 B2 11/2013 Caballero et al.
8,584,945 B2 11/2013 Wang et al.
8,587,595 B2 11/2013 Wang
8,587,697 B2 11/2013 Hussey et al.
8,588,869 B2 11/2013 Sauerwein et al.
8,590,789 B2 11/2013 Nahill et al.
8,596,539 B2 12/2013 Havens et al.
8,596,542 B2 12/2013 Havens et al.
8,596,543 B2 12/2013 Havens et al.
8,599,271 B2 12/2013 Havens et al.
8,599,957 B2 12/2013 Peake et al.
8,600,158 B2 12/2013 Li et al.
8,600,167 B2 12/2013 Showering
8,602,309 B2 12/2013 Longacre et al.
8,608,053 B2 12/2013 Meier et al.
8,608,071 B2 12/2013 Liu et al.
8,611,309 B2 12/2013 Wang et al.
8,615,487 B2 12/2013 Gomez et al.
8,621,123 B2 12/2013 Caballero
8,622,303 B2 1/2014 Meier et al.
8,628,013 B2 1/2014 Ding
8,628,015 B2 1/2014 Wang et al.
8,628,016 B2 1/2014 Winegar
8,629,926 B2 1/2014 Wang
8,630,491 B2 1/2014 Longacre et al.
8,635,309 B2 1/2014 Berthiaume et al.
8,636,200 B2 1/2014 Kearney
8,636,212 B2 1/2014 Nahill et al.
8,636,215 B2 1/2014 Ding et al.
8,636,224 B2 1/2014 Wang
8,638,806 B2 1/2014 Wang et al.
8,640,958 B2 2/2014 Lu et al.
8,640,960 B2 2/2014 Wang et al.
8,643,717 B2 2/2014 Li et al.
8,646,692 B2 2/2014 Meier et al.
8,646,694 B2 2/2014 Wang et al.
8,657,200 B2 2/2014 Ren et al.
8,659,397 B2 2/2014 Vargo et al.
8,668,149 B2 3/2014 Good
8,678,285 B2 3/2014 Kearney
8,678,286 B2 3/2014 Smith et al.
8,682,077 B1 3/2014 Longacre, Jr.
D702,237 S 4/2014 Oberpriller et al.
8,687,282 B2 4/2014 Feng et al.
8,692,927 B2 4/2014 Pease et al.
8,695,880 B2 4/2014 Bremer et al.
8,698,949 B2 4/2014 Grunow et al.
8,702,000 B2 4/2014 Barber et al.
8,717,494 B2 5/2014 Gannon
8,720,783 B2 5/2014 Biss et al.
8,723,804 B2 5/2014 Fletcher et al.
8,723,904 B2 5/2014 Marty et al.
8,727,223 B2 5/2014 Wang
8,736,909 B2 5/2014 Sato et al.
8,740,082 B2 6/2014 Wilz, Sr.
8,740,085 B2 6/2014 Furlong et al.
8,746,563 B2 6/2014 Hennick et al.
8,750,445 B2 6/2014 Peake et al.
8,752,766 B2 6/2014 Xian et al.
8,756,059 B2 6/2014 Braho et al.
8,757,495 B2 6/2014 Qu et al.
8,760,563 B2 6/2014 Koziol et al.
8,777,108 B2 7/2014 Coyle
8,777,109 B2 7/2014 Oberpriller et al.
8,779,898 B2 7/2014 Havens et al.
8,781,520 B2 7/2014 Payne et al.
8,783,573 B2 7/2014 Havens et al.
8,789,757 B2 7/2014 Barten
8,789,758 B2 7/2014 Hawley et al.
8,789,759 B2 7/2014 Xian et al.
8,794,520 B2 8/2014 Wang et al.
8,794,522 B2 8/2014 Ehrhart
8,794,525 B2 8/2014 Amundsen et al.
8,794,526 B2 8/2014 Wang et al.
8,798,367 B2 8/2014 Ellis
8,807,431 B2 8/2014 Wang et al.
8,807,432 B2 8/2014 Van et al.
8,820,630 B2 9/2014 Qu et al.
8,822,848 B2 9/2014 Meagher
8,824,692 B2 9/2014 Sheerin et al.
8,824,696 B2 9/2014 Braho
8,842,849 B2 9/2014 Wahl et al.
8,844,822 B2 9/2014 Kotlarsky et al.
8,844,823 B2 9/2014 Fritz et al.
8,849,019 B2 9/2014 Li et al.
D716,285 S 10/2014 Chaney et al.
8,851,383 B2 10/2014 Yeakley et al.
8,854,633 B2 10/2014 Laffargue et al.

(56) References Cited

U.S. PATENT DOCUMENTS 8,866,963 B2 10/2014 Grunow et al.
8,868,421 B2 10/2014 Braho et al.
8,868,519 B2 10/2014 Maloy et al.
8,868,802 B2 10/2014 Barten
8,868,803 B2 10/2014 Caballero
8,870,074 B1 10/2014 Gannon
8,879,639 B2 11/2014 Sauerwein, Jr.
8,880,426 B2 11/2014 Smith
8,881,983 B2 11/2014 Havens et al.
8,881,987 B2 11/2014 Wang
8,903,172 B2 12/2014 Smith
8,908,995 B2 12/2014 Benos et al.
8,910,870 B2 12/2014 Li et al.
8,910,875 B2 12/2014 Ren et al.
8,914,290 B2 12/2014 Hendrickson et al.
8,914,788 B2 12/2014 Pettinelli et al.
8,915,439 B2 12/2014 Feng et al.
8,915,444 B2 12/2014 Havens et al.
8,916,789 B2 12/2014 Woodburn
8,918,250 B2 12/2014 Hollifield
8,918,564 B2 12/2014 Caballero
8,925,818 B2 1/2015 Kosecki et al.
8,939,374 B2 1/2015 Jovanovski et al.
8,942,480 B2 1/2015 Ellis
8,944,313 B2 2/2015 Williams et al.
8,944,327 B2 2/2015 Meier et al.
8,944,332 B2 2/2015 Harding et al.
8,950,678 B2 2/2015 Germaine et al.
D723,560 S 3/2015 Zhou et al.
8,967,468 B2 3/2015 Gomez et al.
8,971,346 B2 3/2015 Sevier
8,976,030 B2 3/2015 Cunningham et al.
8,976,368 B2 3/2015 El et al.
8,978,981 B2 3/2015 Guan
8,978,983 B2 3/2015 Bremer et al.
8,978,984 B2 3/2015 Hennick et al.
8,985,456 B2 3/2015 Zhu et al.
8,985,457 B2 3/2015 Soule et al.
8,985,459 B2 3/2015 Kearney et al.
8,985,461 B2 3/2015 Gelay et al.
8,988,578 B2 3/2015 Showering
8,988,590 B2 3/2015 Gillet et al.
8,991,704 B2 3/2015 Hopper et al.
8,996,194 B2 3/2015 Davis et al.
8,996,384 B2 3/2015 Funyak et al.
8,998,091 B2 4/2015 Edmonds et al.
9,002,641 B2 4/2015 Showering
9,007,368 B2 4/2015 Laffargue et al.
9,010,641 B2 4/2015 Qu et al.
9,015,513 B2 4/2015 Murawski et al.
9,016,576 B2 4/2015 Brady et al.
D730,357 S 5/2015 Fitch et al.
9,022,288 B2 5/2015 Nahill et al.
9,030,964 B2 5/2015 Essinger et al.
9,033,240 B2 5/2015 Smith et al.
9,033,242 B2 5/2015 Gillet et al.
9,036,054 B2 5/2015 Koziol et al.
9,037,344 B2 5/2015 Chamberlin
9,038,911 B2 5/2015 Xian et al.
9,038,915 B2 5/2015 Smith
D730,901 S 6/2015 Oberpriller et al.
D730,902 S 6/2015 Fitch et al.
D733,112 S 6/2015 Chaney et al.
9,047,098 B2 6/2015 Barten
9,047,359 B2 6/2015 Caballero et al.
9,047,420 B2 6/2015 Caballero
9,047,525 B2 6/2015 Barber et al.
9,047,531 B2 6/2015 Showering et al.
9,049,640 B2 6/2015 Wang et al.
9,053,055 B2 6/2015 Caballero
9,053,378 B1 6/2015 Hou et al.
9,053,380 B2 6/2015 Xian et al.
9,057,641 B2 6/2015 Amundsen et al.
9,058,526 B2 6/2015 Powilleit
9,064,165 B2 6/2015 Havens et al.
9,064,167 B2 6/2015 Xian et al.
9,064,168 B2 6/2015 Todeschini et al.
9,064,254 B2 6/2015 Todeschini et al.
9,066,032 B2 6/2015 Wang
9,070,032 B2 6/2015 Corcoran
D734,339 S 7/2015 Zhou et al.
D734,751 S 7/2015 Oberpriller et al.
9,082,023 B2 7/2015 Feng et al.
9,224,022 B2 12/2015 Ackley et al.
9,224,027 B2 12/2015 Van et al.
D747,321 S 1/2016 London et al.
9,230,140 B1 1/2016 Ackley
9,250,712 B1 2/2016 Todeschini
9,258,033 B2 2/2016 Showering
9,261,398 B2 2/2016 Amundsen et al.
9,262,633 B1 2/2016 Todeschini et al.
9,262,664 B2 2/2016 Soule et al.
9,274,806 B2 3/2016 Barten
9,282,501 B2 3/2016 Wang et al.
9,292,969 B2 3/2016 Laffargue et al.
9,298,667 B2 3/2016 Caballero
9,310,609 B2 4/2016 Rueblinger et al.
9,319,548 B2 4/2016 Showering et al.
D757,009 S 5/2016 Oberpriller et al.
9,342,724 B2 5/2016 McCloskey et al.
9,355,294 B2 5/2016 Smith et al.
9,367,722 B2 6/2016 Xian et al.
9,375,945 B1 6/2016 Bowles
D760,719 S 7/2016 Zhou et al.
9,390,596 B1 7/2016 Todeschini
9,396,375 B2 7/2016 Qu et al.
9,398,008 B2 7/2016 Todeschini et al.
D762,604 S 8/2016 Fitch et al.
D762,647 S 8/2016 Fitch et al.
9,407,840 B2 8/2016 Wang
9,412,242 B2 8/2016 Van et al.
9,418,252 B2 8/2016 Nahill et al.
D766,244 S 9/2016 Zhou et al.
9,443,123 B2 9/2016 Hejl
9,443,222 B2 9/2016 Singel et al.
9,448,610 B2 9/2016 Davis et al.
9,478,113 B2 10/2016 Xie et al.
9,582,696 B2 2/2017 Barber et al.
9,616,749 B2 4/2017 Chamberlin
9,618,993 B2 4/2017 Murawski et al.
9,715,614 B2 7/2017 Todeschini et al.
10,019,334 B2 7/2018 Caballero et al.
10,061,565 B2 * 8/2018 Zabel ........................ G06F 8/34
10,327,158 B2 6/2019 Wang et al.
10,410,029 B2 9/2019 Powilleit
2003/0046346 A1 3/2003 Mumick et al.
2004/0181467 A1 9/2004 Raiyani et al.
2006/0149558 A1 7/2006 Kahn et al.
2007/0063048 A1 3/2007 Havens et al.
2007/0260972 A1 11/2007 Anderl
2009/0134221 A1 5/2009 Zhu et al.
2009/0171659 A1 7/2009 Pearce et al.
2010/0177076 A1 7/2010 Essinger et al.
2010/0177080 A1 7/2010 Essinger et al.
2010/0177707 A1 7/2010 Essinger et al.
2010/0177749 A1 7/2010 Essinger et al.
2010/0265880 A1 10/2010 Rautiola et al.
2011/0169999 A1 7/2011 Grunow et al.
2011/0202554 A1 8/2011 Powilleit et al.
2012/0111946 A1 5/2012 Golant
2012/0168512 A1 7/2012 Kotlarsky et al.
2012/0193423 A1 8/2012 Samek
2012/0203647 A1 8/2012 Smith
2012/0223141 A1 9/2012 Good et al.
2013/0043312 A1 2/2013 Van Horn
2013/0075168 A1 3/2013 Amundsen et al.
2013/0175341 A1 7/2013 Kearney et al.
2013/0175343 A1 7/2013 Good
2013/0257744 A1 10/2013 Daghigh et al.
2013/0257759 A1 10/2013 Daghigh
2013/0270346 A1 10/2013 Xian et al.
2013/0287258 A1 10/2013 Kearney
2013/0292475 A1 11/2013 Kotlarsky et al.
2013/0292477 A1 11/2013 Hennick et al.

(56) References Cited

U.S. PATENT DOCUMENTS

2013/0293539 A1 11/2013 Hunt et al.
2013/0293540 A1 11/2013 Laffargue et al.
2013/0306728 A1 11/2013 Thuries et al.
2013/0306731 A1 11/2013 Pedrao
2013/0307964 A1 11/2013 Bremer et al.
2013/0308625 A1 11/2013 Park et al.
2013/0313324 A1 11/2013 Koziol et al.
2013/0313325 A1 11/2013 Wilz et al.
2013/0342717 A1 12/2013 Havens et al.
2014/0001267 A1 1/2014 Giordano et al.
2014/0002828 A1 1/2014 Laffargue et al.
2014/0008439 A1 1/2014 Wang
2014/0025584 A1 1/2014 Liu et al.
2014/0034734 A1 2/2014 Sauerwein, Jr.
2014/0036848 A1 2/2014 Pease et al.
2014/0039693 A1 2/2014 Havens et al.
2014/0042814 A1 2/2014 Kather et al.
2014/0049120 A1 2/2014 Kohtz et al.
2014/0049635 A1 2/2014 Laffargue et al.
2014/0061306 A1 3/2014 Wu et al.
2014/0063289 A1 3/2014 Hussey et al.
2014/0066136 A1 3/2014 Sauerwein et al.
2014/0067692 A1 3/2014 Ye et al.
2014/0070005 A1 3/2014 Nahill et al.
2014/0071840 A1 3/2014 Venancio
2014/0074746 A1 3/2014 Wang
2014/0076974 A1 3/2014 Havens et al.
2014/0078341 A1 3/2014 Havens et al.
2014/0078342 A1 3/2014 Li et al.
2014/0078345 A1 3/2014 Showering
2014/0098792 A1 4/2014 Wang et al.
2014/0100774 A1 4/2014 Showering
2014/0100813 A1 4/2014 Showering
2014/0103115 A1 4/2014 Meier et al.
2014/0104413 A1 4/2014 McCloskey et al.
2014/0104414 A1 4/2014 McCloskey et al.
2014/0104416 A1 4/2014 Giordano et al.
2014/0104451 A1 4/2014 Todeschini et al.
2014/0106594 A1 4/2014 Skvoretz
2014/0106725 A1 4/2014 Sauerwein, Jr.
2014/0108010 A1 4/2014 Maltseff et al.
2014/0108402 A1 4/2014 Gomez et al.
2014/0108682 A1 4/2014 Caballero
2014/0110485 A1 4/2014 Toa et al.
2014/0114530 A1 4/2014 Fitch et al.
2014/0121438 A1 5/2014 Long et al.
2014/0121445 A1 5/2014 Fontenot et al.
2014/0124577 A1 5/2014 Wang et al.
2014/0124579 A1 5/2014 Ding
2014/0125842 A1 5/2014 Winegar
2014/0125853 A1 5/2014 Wang
2014/0125999 A1 5/2014 Longacre et al.
2014/0129378 A1 5/2014 Richardson
2014/0131438 A1 5/2014 Kearney
2014/0131441 A1 5/2014 Nahill et al.
2014/0131443 A1 5/2014 Smith
2014/0131444 A1 5/2014 Wang
2014/0131445 A1 5/2014 Ding et al.
2014/0131448 A1 5/2014 Xian et al.
2014/0133379 A1 5/2014 Wang et al.
2014/0136208 A1 5/2014 Maltseff et al.
2014/0140585 A1 5/2014 Wang
2014/0151453 A1 6/2014 Meier et al.
2014/0152882 A1 6/2014 Samek et al.
2014/0158770 A1 6/2014 Sevier et al.
2014/0159869 A1 6/2014 Zumsteg et al.
2014/0166755 A1 6/2014 Liu et al.
2014/0166757 A1 6/2014 Smith
2014/0166759 A1 6/2014 Liu et al.
2014/0168787 A1 6/2014 Wang et al.
2014/0175165 A1 6/2014 Havens et al.
2014/0175172 A1 6/2014 Jovanovski et al.
2014/0191644 A1 7/2014 Chaney
2014/0191913 A1 7/2014 Ge et al.
2014/0197238 A1 7/2014 Liu et al.
2014/0197239 A1 7/2014 Havens et al.
2014/0197304 A1 7/2014 Feng et al.
2014/0203087 A1 7/2014 Smith et al.
2014/0204268 A1 7/2014 Grunow et al.
2014/0214631 A1 7/2014 Hansen
2014/0217166 A1 8/2014 Berthiaume et al.
2014/0217180 A1 8/2014 Liu
2014/0231500 A1 8/2014 Ehrhart et al.
2014/0232930 A1 8/2014 Anderson
2014/0247315 A1 9/2014 Marty et al.
2014/0263493 A1 9/2014 Amurgis et al.
2014/0263645 A1 9/2014 Smith et al.
2014/0267609 A1 9/2014 Laffargue
2014/0270196 A1 9/2014 Braho et al.
2014/0270229 A1 9/2014 Braho
2014/0278387 A1 9/2014 Digregorio
2014/0278391 A1 9/2014 Braho et al.
2014/0282210 A1 9/2014 Bianconi
2014/0284384 A1 9/2014 Lu et al.
2014/0288933 A1 9/2014 Braho et al.
2014/0297058 A1 10/2014 Barker et al.
2014/0299665 A1 10/2014 Barber et al.
2014/0312121 A1 10/2014 Lu et al.
2014/0319220 A1 10/2014 Coyle
2014/0319221 A1 10/2014 Oberpriller et al.
2014/0326787 A1 11/2014 Barten
2014/0332590 A1 11/2014 Wang et al.
2014/0344943 A1 11/2014 Todeschini et al.
2014/0346233 A1 11/2014 Liu et al.
2014/0351317 A1 11/2014 Smith et al.
2014/0353373 A1 12/2014 Van et al.
2014/0361073 A1 12/2014 Qu et al.
2014/0361082 A1 12/2014 Xian et al.
2014/0362184 A1 12/2014 Jovanovski et al.
2014/0363015 A1 12/2014 Braho
2014/0369511 A1 12/2014 Sheerin et al.
2014/0374483 A1 12/2014 Lu
2014/0374485 A1 12/2014 Xian et al.
2015/0001301 A1 1/2015 Ouyang
2015/0001304 A1 1/2015 Todeschini
2015/0003673 A1 1/2015 Fletcher
2015/0009338 A1 1/2015 Laffargue et al.
2015/0009610 A1 1/2015 London et al.
2015/0014416 A1 1/2015 Kotlarsky et al.
2015/0021397 A1 1/2015 Rueblinger et al.
2015/0028102 A1 1/2015 Ren et al.
2015/0028103 A1 1/2015 Jiang
2015/0028104 A1 1/2015 Ma et al.
2015/0029002 A1 1/2015 Yeakley et al.
2015/0032709 A1 1/2015 Maloy et al.
2015/0039309 A1 2/2015 Braho et al.
2015/0040378 A1 2/2015 Saber et al.
2015/0048168 A1 2/2015 Fritz et al.
2015/0049347 A1 2/2015 Laffargue et al.
2015/0051992 A1 2/2015 Smith
2015/0053766 A1 2/2015 Havens et al.
2015/0053768 A1 2/2015 Wang et al.
2015/0053769 A1 2/2015 Thuries et al.
2015/0062366 A1 3/2015 Liu et al.
2015/0063215 A1 3/2015 Wang
2015/0063676 A1 3/2015 Lloyd et al.
2015/0069130 A1 3/2015 Gannon
2015/0071818 A1 3/2015 Scheuren et al.
2015/0071819 A1 3/2015 Todeschini
2015/0083800 A1 3/2015 Li et al.
2015/0086114 A1 3/2015 Todeschini
2015/0088522 A1 3/2015 Hendrickson et al.
2015/0096872 A1 4/2015 Woodburn
2015/0099557 A1 4/2015 Pettinelli et al.
2015/0100196 A1 4/2015 Hollifield
2015/0102109 A1 4/2015 Huck
2015/0115035 A1 4/2015 Meier et al.
2015/0127791 A1 5/2015 Kosecki et al.
2015/0128116 A1 5/2015 Chen et al.
2015/0129659 A1 5/2015 Feng et al.
2015/0133047 A1 5/2015 Smith et al.
2015/0134470 A1 5/2015 Hejl et al.
2015/0136851 A1 5/2015 Harding et al.
2015/0136854 A1 5/2015 Lu et al.

(56) References Cited

U.S. PATENT DOCUMENTS

2015/0142492 A1 5/2015 Kumar
2015/0144692 A1 5/2015 Hejl
2015/0144698 A1 5/2015 Teng et al.
2015/0144701 A1 5/2015 Xian et al.
2015/0149946 A1 5/2015 Benos et al.
2015/0161429 A1 6/2015 Xian
2015/0169925 A1 6/2015 Chen et al.
2015/0169929 A1 6/2015 Williams et al.
2015/0178523 A1 6/2015 Gelay et al.
2015/0178534 A1 6/2015 Jovanovski et al.
2015/0178535 A1 6/2015 Bremer et al.
2015/0178536 A1 6/2015 Hennick et al.
2015/0178537 A1 6/2015 El Akel et al.
2015/0181093 A1 6/2015 Wang et al.
2015/0181109 A1 6/2015 Gillet et al.
2015/0186703 A1 7/2015 Chen et al.
2015/0193644 A1 7/2015 Kearney et al.
2015/0193645 A1 7/2015 Colavito et al.
2015/0199957 A1 7/2015 Funyak et al.
2015/0204671 A1 7/2015 Showering
2015/0210199 A1 7/2015 Payne
2015/0220753 A1 8/2015 Zhu et al.
2015/0220901 A1 8/2015 Gomez et al.
2015/0236984 A1 8/2015 Sevier
2015/0254485 A1 9/2015 Feng et al.
2015/0327012 A1 11/2015 Bian et al.
2016/0014251 A1 1/2016 Hejl
2016/0040982 A1 2/2016 Li et al.
2016/0042241 A1 2/2016 Todeschini
2016/0057230 A1 2/2016 Todeschini et al.
2016/0109219 A1 4/2016 Ackley et al.
2016/0109220 A1 4/2016 Laffargue et al.
2016/0109224 A1 4/2016 Thuries et al.
2016/0112631 A1 4/2016 Ackley et al.
2016/0112643 A1 4/2016 Laffargue et al.
2016/0124516 A1 5/2016 Schoon et al.
2016/0125217 A1 5/2016 Todeschini
2016/0125342 A1 5/2016 Miller et al.
2016/0125873 A1 5/2016 Braho et al.
2016/0133253 A1 5/2016 Braho et al.
2016/0171720 A1 6/2016 Todeschini
2016/0178479 A1 6/2016 Goldsmith
2016/0180678 A1 6/2016 Ackley et al.
2016/0189087 A1 6/2016 Morton et al.
2016/0227912 A1 8/2016 Oberpriller et al.
2016/0232891 A1 8/2016 Pecorari
2016/0292477 A1 10/2016 Bidwell
2016/0294779 A1 10/2016 Yeakley et al.
2016/0306769 A1 10/2016 Kohtz et al.
2016/0314276 A1 10/2016 Wilz et al.
2016/0314294 A1 10/2016 Kubler et al.

FOREIGN PATENT DOCUMENTS

WO 2014/019130 A1 2/2014
WO 2014/110495 A1 7/2014

OTHER PUBLICATIONS

Apple, "Navigation Controllers", 2014, Apple Inc., 19 pages (Year: 2014).*

Artem Syromiatnikov, "A Journey Through the Land of Model-View-* Design Patterns", 2014, Linnaeus University, Sweden, 57 pages. (Year: 2014).*

U.S. Patent Application for Tracking Battery Conditions filed May 4, 2015 (Young et al.); 70 pages, U.S. Appl. No. 14/702,979.

U.S. Patent Application for Terminal Having Illumination and Focus Control filed May 21, 2014 (Liu et al.); 31 pages; now abandoned, U.S. Appl. No. 14/283,282.

U.S. Patent Application for Tactile Switch for a Mobile Electronic Device filed Jun. 16, 2015 (Bamdringa); 38 pages, U.S. Appl. No. 14/740,320.

U.S. Patent Application for Tablet Computer With Removable Scanning Device filed Apr. 27, 2015 (Schulte et al.); 19 pages, U.S. Appl. No. 29/525,068.

U.S. Patent Application for Table Computer filed Feb. 6, 2015 (Bidwell et al.); 13 pages, U.S. Appl. No. 29/516,892.

U.S. Patent Application for System and Method for Regulating Barcode Data Injection Into a Running Application on a Smart Device filed May 1, 2015 (Todeschini et al.); 38 pages, U.S. Appl. No. 14/702,110.

U.S. Patent Application for Optical Pattern Projector filed Jun. 23, 2015 (Thuries et al.); 33 pages, U.S. Appl. No. 14/747,197.

U.S. Patent Application for Multipurpose Optical Reader, filed May 14, 2014 (Jovanovski et al); 59 pages; now abandoned., U.S. Appl. No. 14/277,337.

U.S. Patent Application Multifunction Point of Sale Apparatus With Optical Signature Capture filed Jul. 30, 2014 (Good et al.); 37 pages; now abandoned, U.S. Appl. No. 14/446,391.

U.S. Patent Application for Mobile Computer Housing filed Jun. 2, 2015 (Fitch et al.); 61 pages;, U.S. Appl. No. 29/528,890.

U.S. Patent Application for Method and System to Protect Software-Based Network-Connected Devices From Advanced Persistent Threat filed May 6, 2015 (Hussey et al.); 42 pages, U.S. Appl. No. 14/705,407.

U.S. Patent Application for Intermediate Linear Positioning filed May 5, 2015 (Charpentier et al); 60 pages, U.S. Appl. No. 14/704,050.

U.S. Patent Application for Indicia-Reading Systems Having an Interface With a User's Nervous System filed Jun. 10, 2015 (Todeschini); 39 pages, U.S. Appl. No. 14/735,717.

U.S. Patent Application for Indicia Reading Device filed Jun. 8, 2015 (Zhou et al.); 14 pages, U.S. Appl. No. 29/529,441.

U.S. Patent Application for Hands-Free Human Machine Interface Responsive to a Driver of a Vehicle filed May 6, 2015 (Fitch et al.); 44 pages, U.S. Appl. No. 14/705,012.

U.S. Patent Application for Handle for a Tablet Computer filed Apr. 7, 2015 (Bidwell et al.); 17 pages, U.S. Appl. No. 29/523,098.

U.S. Patent Application for Evaluating Image Values filed May 19, 2015 (Ackley); 60 pages, U.S. Appl. No. 14/715,916.

U.S. Patent Application for Dual-Projector Three-Dimensional Scanner filed Jun. 23, 2015 (Jovanovski et al.); 40 pages, U.S. Appl. No. 14/747,490.

U.S. Patent Application for Cyclone filed Jun. 18, 2015 (Vargo et al); 16 pages, U.S. Appl. No. 29/530,600.

U.S. Patent Application for Charging Base filed May 14, 2015 (Fitch et al.); 10 pages, U.S. Appl. No. 29/526,918.

U.S. Patent Application for Augumented Reality Enabled Hazard Display filed May 19, 2015 (Venkatesha et al.); 35 pages, U.S. Appl. No. 14/715,672.

U.S. Patent Application for Application Independent DEX/UCS Interface filed May 8, 2015 (Pape); 47 pages, U.S. Appl. No. 14/707,123.

U.S. Patent Application for an Electronic Device Case, filed Sep. 26, 2013 (Oberpriller et al.); 44 pages, U.S. Appl. No. 29/468,118.

U.S. Pat. Appl. filed Feb. 7, 2012, (Feng et al.); now abandoned., U.S. Appl. No. 13/367,978.

U.S Patent Application for Calibrating a Volume Dimensioner filed Jun. 16, 2015 (Ackley et al.); 63 pages, U.S. Appl. No. 14/740,373.

Matt Milner, "A Developer's Introduction to Windows Workflow Foundation (WF) in .NET 4", 2009, retrieved from https://msdn.microsoft.com/enus/library/ee342461.aspx , 51 pages.

Corcho et al., "A Platform for the Development of Semantic Web Portals", 2006, ICWE'06—Proceedings of the 6th international conference on Web engineering, 8 pages.

Alfons Brandi, "Concepts for Generating Multi-User Interfaces Including graphical Editors", Chapter 15, 2002, Computer-Aided Design of User Interfaces III, Kluwer Academic Publishers, pp. 167-178.

Ahmed Seffah et al., "Multiple User Interfaces: Towards a Task-Driven and Patterns-Oriented Design Model", 2002, Springer-Verlag Berlin Heidelberg 2002, pp. 118-132.

Final Rejection dated Dec. 29, 2017 for U.S. Appl. No. 14/987,809.

Non-Final Rejection dated Jun. 15, 2017 for U.S. Appl. No. 14/987,809.

(56) References Cited

OTHER PUBLICATIONS

Notice of Allowance and Fees Due (PTOL-85) dated May 3, 2018 for U.S. Appl. No. 14/987,809.

* cited by examiner

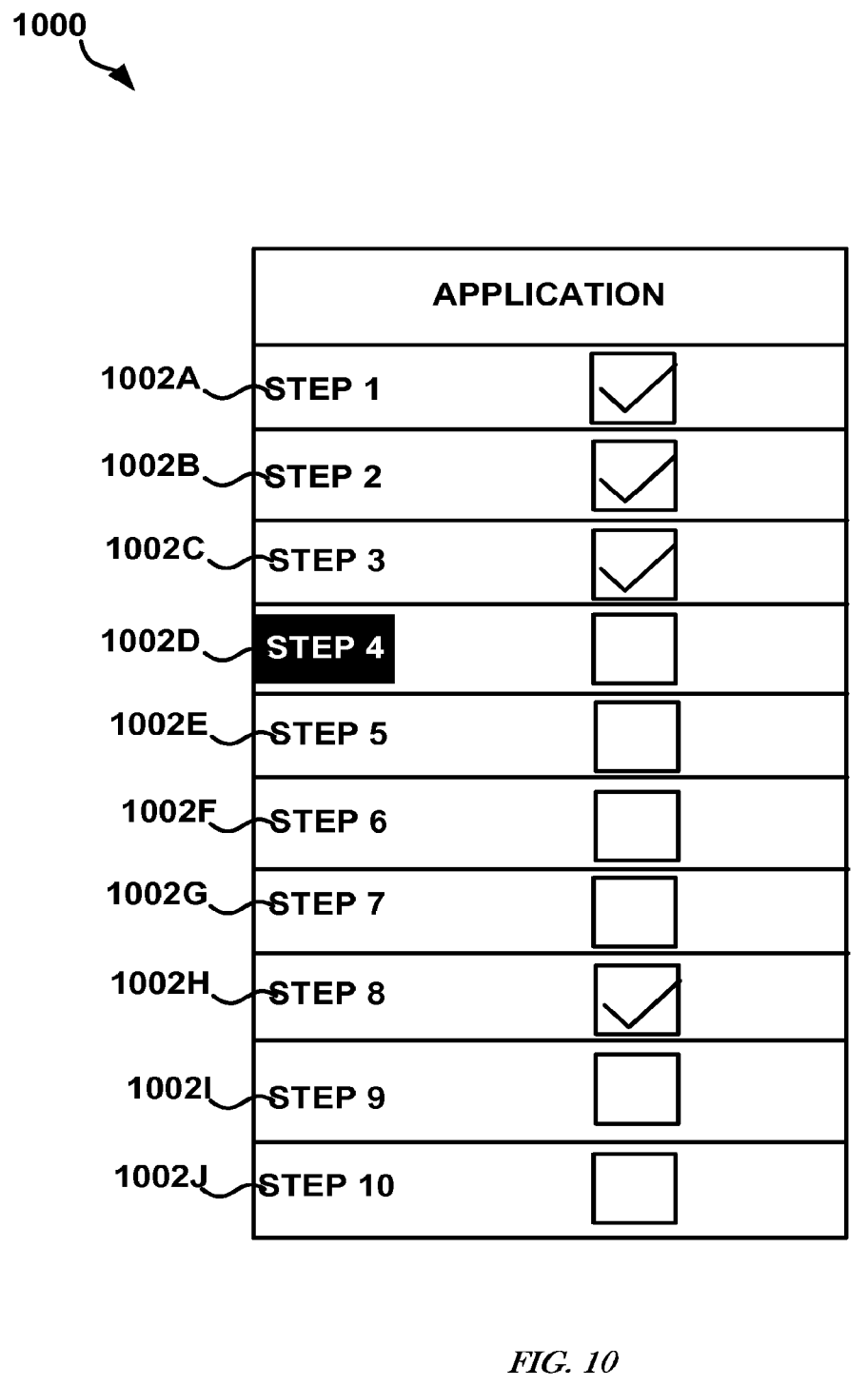

1000

APPLICATION

1002A STEP 1

1002B STEP 2

1002C STEP 3

1002D STEP 4

1002E STEP 5

1002F STEP 6

1002G STEP 7

1002H STEP 8

1002I STEP 9

1002J STEP 10

*FIG. 10*

APPLICATION DEVELOPMENT USING MULTIPLE PRIMARY USER INTERFACES

CROSS-REFERENCE TO RELATED APPLICATIONS

This application is a continuation of U.S. patent application Ser. No. 14/987,809 for Application Development Using Multiple Primary User Interfaces, filed on Jan. 5, 2016, which claims the benefit of and priority to U.S. Provisional Patent Application No. 62/101,203 for Application Development Using Multiple Primary User Interfaces, filed on Jan. 8, 2015, the contents of which are hereby incorporated by reference in their entirety.

BACKGROUND

Modern mobile devices may be used by workers in performing their job duties. The primary means of interacting with applications on these mobile devices is through the touchscreen (e.g., display and virtual keyboard). The development paradigm for these devices tends to focus solely on the touchscreen as the primary means of input and output with some applications including voice dialog as a secondary means of interacting with an application.

SUMMARY

In one or more embodiments, an apparatus can include a workflow activity repository including a plurality of workflow activities stored thereon, wherein each workflow activity of the plurality of workflow activities includes data corresponding to a configuration of a view model module and a list of views to be associated with the configuration, the data causes the view model module to perform one or more operations that cause a plurality of views of the list of views to be presented on multiple primary user interfaces in response to the data being loaded into the view model module, and an application development module communicatively coupled to the workflow activity repository, wherein the application development module is configured to cause a view of an application being built using the application development module to be displayed to a user, the application development module configured to provide an environment in which a user defines connections between workflow activities of the plurality of workflow activities and produce an application model based on the user-defined connections and the workflow activities connected by the connections.

In one or more embodiments, a method can include receiving, at an application development environment, data indicating a plurality of workflow activities to be used in an application, each of the workflow activities including data corresponding to a configuration of a view model module and a list of views to be associated with the configuration, receiving, at the application development environment, data indicating a plurality of primary user interface views to associate with each of the workflow activities, receiving, at the application development environment, data indicating a connection between two of the workflow activities of the plurality of workflow activities, and producing an application model based on the received data indicating the plurality of workflow activities, the data indicates the connection between two of the workflow activities and the data indicating the plurality of primary user interface views.

In one or more embodiments, a non-transitory computer readable medium (e.g., storage device) can include instructions stored thereon that, when executed by a machine, configure the machine to perform operations comprising receiving data indicating a plurality of workflow activities to be used in an application, each of the workflow activities including data corresponding to a configuration of a view model module and a list of views to be associated with the configuration, receiving data indicating a plurality of primary user interface views to associate with each of the workflow activities, receiving data indicating a connection between two of the workflow activities of the plurality of workflow activities, and producing an application model based on the received data indicating the plurality of workflow activities, the data indicates the connection between two of the workflow activities and the data indicating the plurality of primary user interface views.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 10 illustrates, by way of example, an embodiment of a visual view of an application that includes directing the user to perform a plurality of tasks.

DETAILED DESCRIPTION

Figure 1:
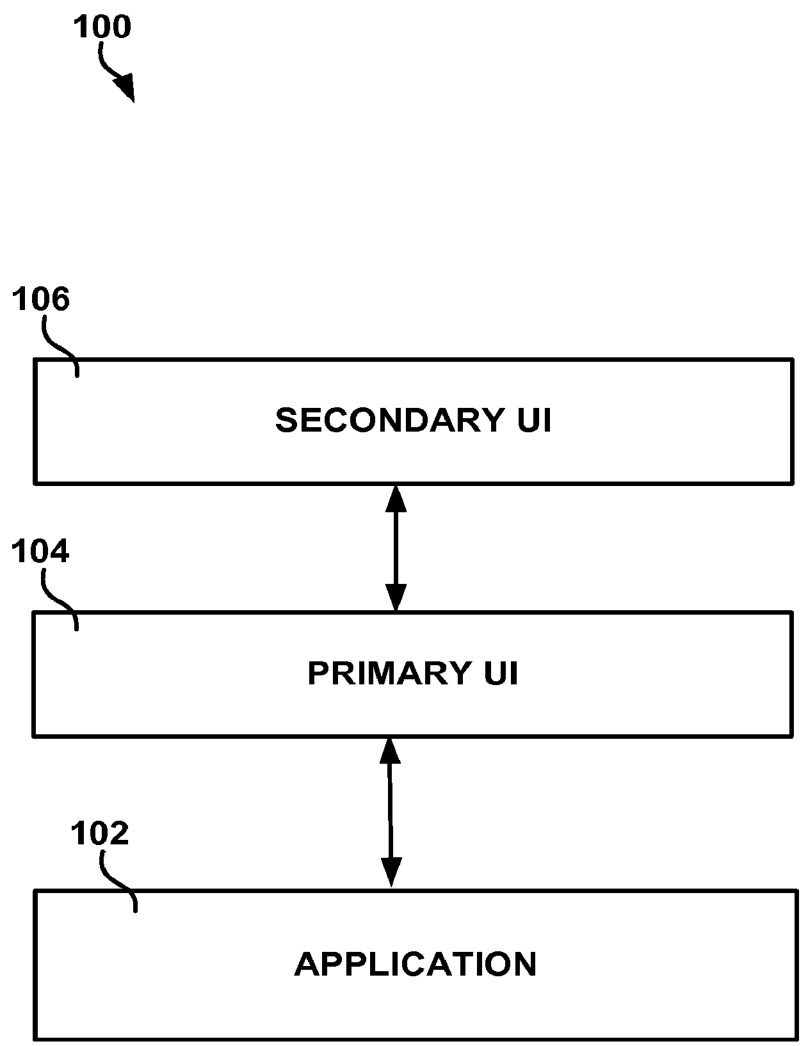
FIG. 1 illustrates a block diagram of a conventional application display system.

While embodiments of this disclosure can take many different forms, specific embodiments thereof are shown in the figures and will be described herein in detail with the understanding that the present disclosure is to be considered as embodiments of the principles of the disclosure, as well as the best mode of practicing the same, and is not intended to limit the disclosure to the specific embodiments illustrated.

Software applications for mobile device can have a one-to-one relationship between an application state and an interactive view presented to the user, such as through a user interface (UI). This one-to-one relationship can limit the ability of an application developer in adding another mode of interaction and can make it more difficult or even prohibit adding another primary mode of interaction. This paradigm of interfacing with an application via one primary interface can be restrictive.

Using this one-to-one paradigm, adding other modes of interaction such as voice, scanning, or motion can be achieved through supplementing the primary mode with a secondary mode, the touchscreen. As a consequence, the developer is limited to the design layout of the primary mode. If the primary mode is unavailable, the additional modes of interaction do not make sense or are also unavailable. Creating an effective supplementary voice dialogue view can be difficult under these limitations. Difficulties are met when trying to allow more than one mode to be in control of the application's state at the same time, such as a visual view and a voice dialogue view.

Discussed herein are embodiments that can include a UI abstraction that can overcome one or more of the limitations of the one-to-one paradigm. The UI abstraction can be used to decouple an application state from a mode of interaction. Such an abstraction can provide flexibility and versatility to an application developer. By creating a UI abstraction, such as for input and output, multiple UI objects can be active and able to control the application's state at the same time. For example, a GUI (graphical user interface) and VUI (voice user interface) can coexist to interface with the application.

One UI view can be associated with one or more application states, and that view can be different than other views for that same application state. In this way, an application developer can define multiple, separate independent views for each application state and/or multiple primary independent user interfaces can be enabled. The dependency of the application to a primary mode of operation can be eliminated and the interaction mode of the application can be decoupled from the application.

Multiple primary UIs can be accomplished by associating multiple views with an application state, giving an N:1 view to application state ratio, where N is the number of primary UI views. Each view for a state can be active simultaneously. Each view can access the application, retrieving or sending information to or from the application. The information received from one view can be reflected in all currently active views. In an embodiment that includes voice dialogue and visual views, there can be two views that have simultaneous access to the application, such as to have the ability to cause the application state to change.

What follows is a discussion of a prior application display system followed by a discussion of a display system in accord with one or more embodiments, then a discussion of how one or more navigation stacks can be managed, and then a discussion of some application development techniques is presented.

FIG. 1 illustrates a block diagram of a conventional application display system 100. The system 100 as illustrated includes an application 102, a primary UI 104, and a secondary UI 106.

As used herein a "primary UI" is a UI though which a user can directly alter the state of an application independent of any other UI. A "secondary UI" is a UI through which a user can input data into a specific field of the primary UI. The secondary UI does not alter the state of an application, but is dependent on another UI (i.e. the primary UI) to update the state of an application. Using multiple primary UIs, a user can directly alter the application state using any one of the primary UIs. Using multiple primary UIs, a user can deactivate (e.g., disable or power off) one of the other primary UIs and can continue to alter the state of the application directly using the remaining active primary UIs. In the case of a secondary UI coupled with a primary UI, if the primary UI is deactivated or disabled, a user will not be able to alter the state of the application using the secondary UI or the primary UI.

The primary UI 104 is required for a user to alter an application state of the application 102. The user can interact with the application 102 using the secondary UI 106, but only via the primary UI 104. For example, consider a mobile device that includes a touch screen as a primary UI and a voice dialogue as a secondary UI. A user can speak a command into the voice dialogue, such as "get directions home". The voice dialogue can then be translated into commands that are issued by the primary user interface to the application. If the primary UI 104 is deactivated or disabled, the secondary UI 106 will not be able to access the application 102, thus making it impossible for the user to interact with the application 102 using only the voice dialogue (i.e. the secondary UI 106 in this example).

Multiple Primary UIS

Figure 2:
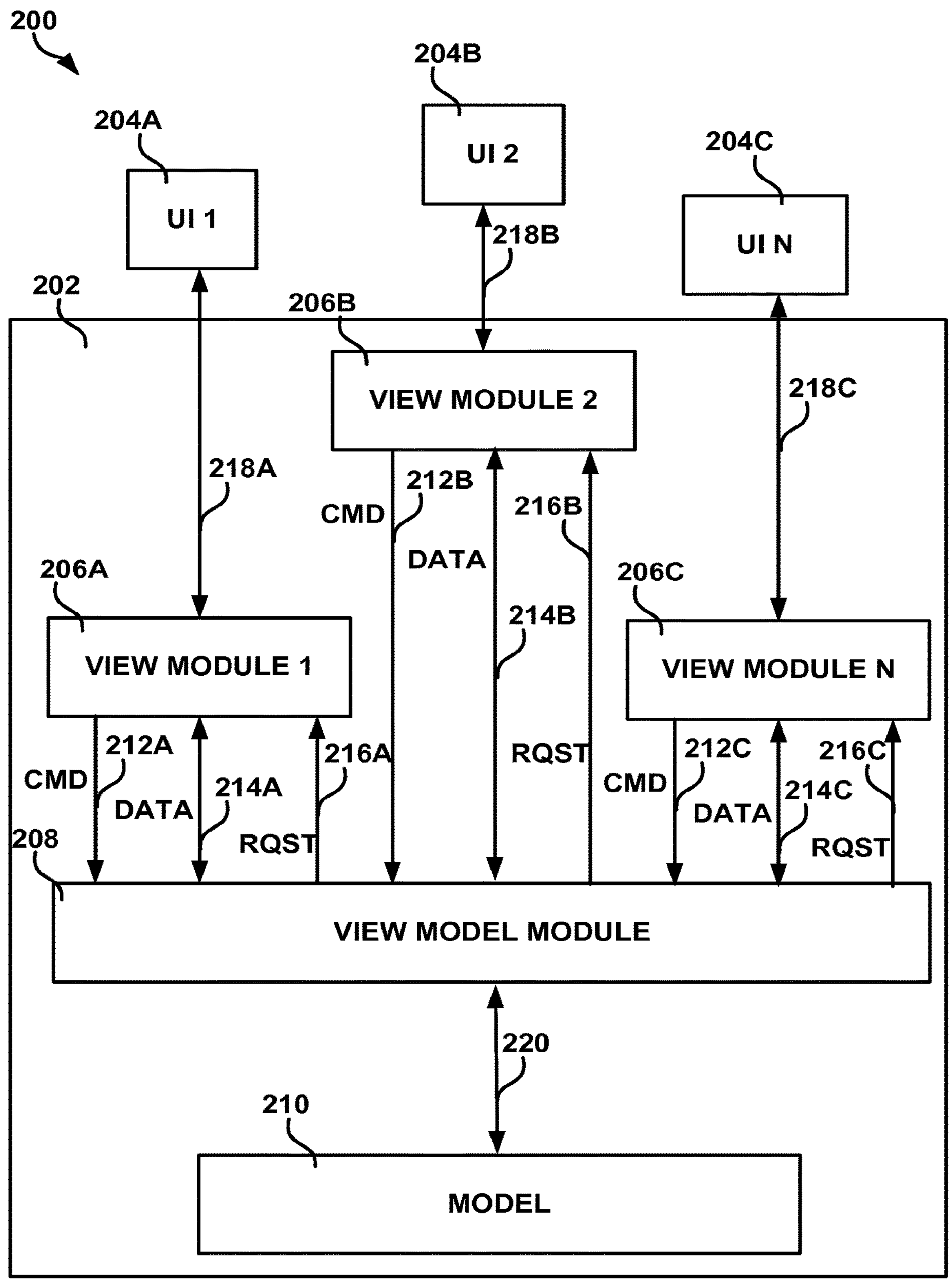
FIG. 2 illustrates, by way of example, a block diagram of an embodiment of a multi-view system.

FIG. 2 illustrates, by way of example, a block diagram of an embodiment of a multi-view system 200. The multi-view system 200 as illustrated includes an application 102 and a plurality of primary UIs 204A, 204B, and 204C. The application 202 as illustrated includes a plurality of view modules 206A, 206B, and 206C communicatively coupled to respective primary UIs 204A-C. The view modules 206A-C are each communicatively coupled to a view model module 208 through the connections 212A, 214A, and 216A, 212B, 214B, and 216B, and 212C, 214C, and 216C, respectively. The view model module 208 is communicatively coupled to a model 210 (e.g., application logic) through the connection 216. The view modules 206A-C may be referred to in the industry as "views" and the view model module 208 may be referred to in the industry as a "view model". The model 210 may be implemented as a module.

The application 202 can be any software application that can benefit from or use multiple primary UIs 204A-C. The application 202 can provide a workflow of instructions to a worker, for example. For example, the application 202 can provide a workflow for diagnosing or fixing an issue with a vehicle or other equipment, picking merchandise from a shelf, such as in a warehouse, retail store, etc., a video game in which a user can issue commands in multiple ways, such as using two or more of voice, a keyboard, a joystick, etc., a data entry application, or a text editing application, among others. The application 202 can be embodied in the form of instructions stored on a storage device, such as a read only memory (ROM) a random access memory (RAM), or a combination thereof, and executable by a processor of a machine.

The view modules 206A-C can provide data, such as through the connection 218A, 218B, and 218C, respectively, to the primary UIs 204A-C that cause the UIs 204A-C to render a view of an application state of the application 202. The view of the application 202 provided by the UI 204A-C can include a voice dialogue view, a visual view, or a combination thereof. The voice dialogue view can be presented to a user through a UI 204A-C that includes a speaker and microphone. The user can provide data, instruction, or confirmation to the UI 204A-C through the microphone and the UI 204A-C can provide the user data, instruction, or confirmation through the speaker. The visual view can include a UI 204A-C that includes a display and keyboard (e.g., a touchscreen and a virtual or hardware keyboard or a non-tactile screen coupled to a hardware keyboard), a printer that can display or print (on paper) one or more instructions, images, and/or other text and/or receive user input through a keyboard (e.g., keypad or touchscreen) coupled thereto, a monitor or other display (e.g., a remote monitor, a secondary monitor, a projector and projector screen, or the like), and/or a barcode scanner (e.g., a one-dimensional or multi-dimensional barcode scanner, such as a Universal Product Code (UPC) or Quick Response (QR) code scanner) that includes a display (e.g., a touch screen or non-tactile display) and/or a keyboard (e.g., a keypad, a virtual keyboard, or a hardware keyboard) coupled thereto.

The view module 206A-C is not required to provide both input and output. For example, a screen does not need to be paired with a keyboard, scanner, and/or touchpad. The view module 206A-C can provide output only, such as a screen, printer, speaker, Light Emitting Diode (LED), or the like. A separate view module can take input for the application, such as a touch screen, scanner, voice, pressure sensor, accelerator, temperature sensor, proximity sensor, or the like. The view module 206A-C may provide input, output, or both input and output for the application 202. The application 202 may have any number of view modules, none of which know about any of the other view modules.

The view modules 206A-C can receive information from the primary UIs 204A-C and translate the information from the UIs 204A-C into a command and/or data to be sent to the view model module 208, such as by using the connections 212A-C, 214A-C, and/or 216A-C. For example, if a user enters data into a field using the UI 204A-C, the data received can be converted into a format compatible with the view model module 208. The view module 206A-C can indicate to the view model module 208 the field in which the data was added. The view model module 208 determines, using the model 210, an action (if any) to take in receiving information from the UI 204A-C through the view module 206A-C. The model 210 includes logic to determine a state of the application 202 (see FIG. 3 for a simplified flow diagram of application state logic, in accord with one or more embodiments).

The view model module 208 determines instructions (e.g., a request and/or data) to be provided to the view module 206A-C so that the UI 204A-C communicatively coupled to the respective view module 206A-C provides a view of the application state consistent with the current state of the application 202, as determined by the application model 210.

Figure 3:
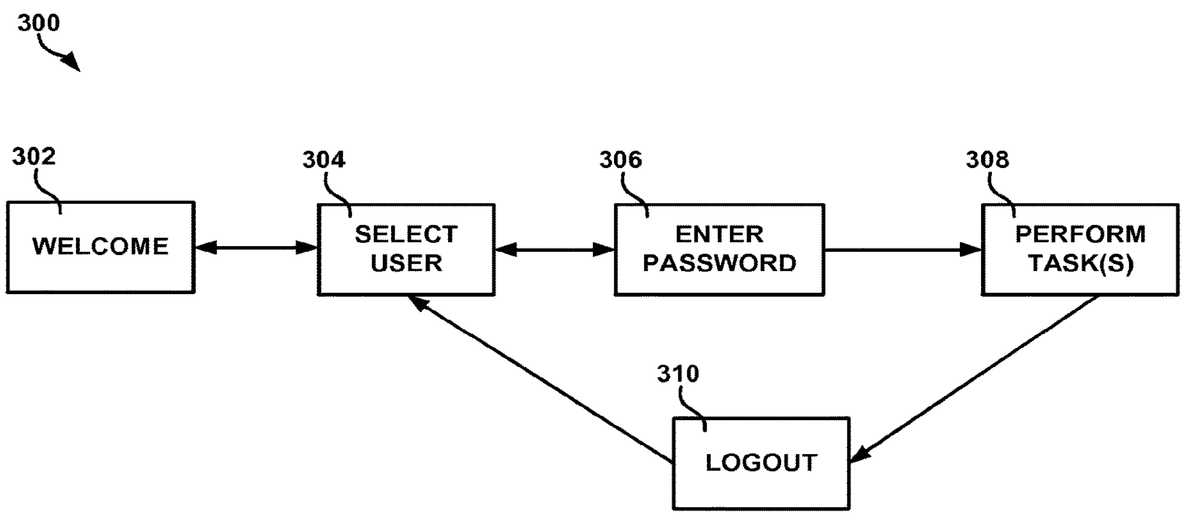
FIG. 3 illustrates, by way of example, a flow diagram of application states of a generic application.
Figure 4:
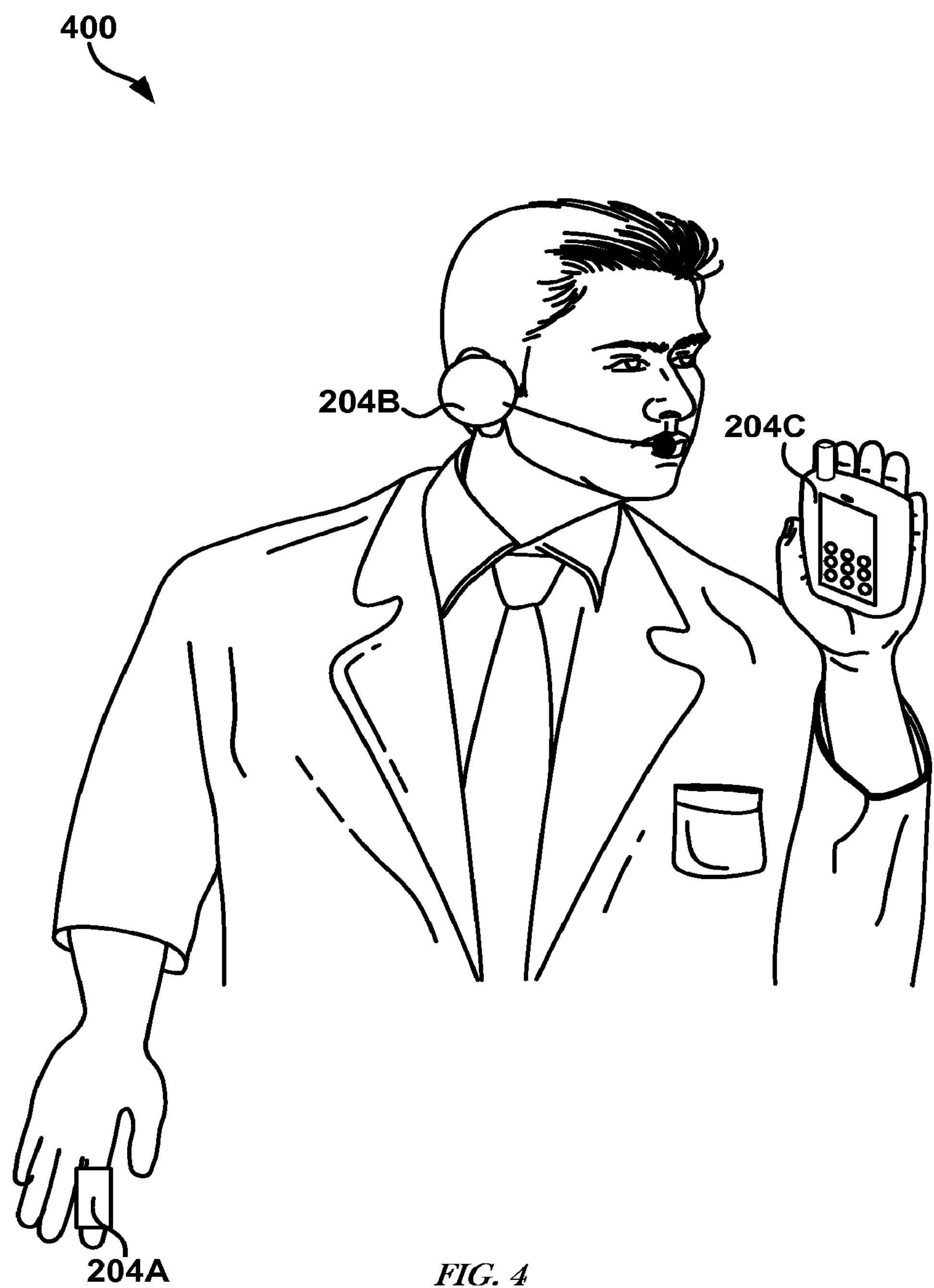
FIG. 4 illustrates, by way of example, a block diagram of an embodiment of a use case including a user using multiple primary UIs.

FIG. 3 illustrates, by way of example, a flow diagram of application states 300 of a generic application, such as the application 202. FIG. 4 illustrates, by way of example, an embodiment of a use case including a user 400 with the UIs 204A-C. When the application 202 is launched and/or initialized, a welcome state 302 can be entered. The welcome state 302 can include respective views from each of the primary UIs 204A-C that are rendered by the view modules 206A-C. In the example of FIG. 4, the UI 204A includes a barcode scanner and a display, the UI 204B includes a microphone and a speaker, and the UI 204C includes a touch screen and virtual keyboard. The UIs 204A and 204C can display to a user some visual indication that the application has launched, such as text or other graphic. The UI 204B can indicate to the user, through a speaker, that the application has launched, such as by announcing "welcome" or the like. The visual UIs 204A and 204C can indicate that the user confirmation is required to move onto the next application state or the next application state 304, (i.e. select user) can be entered through a specified period of time elapsing since the application state 302.

The voice dialogue UI 204B can indicate to the user through sounds emanated through the speaker that a confirmation is required. After the user confirms using any one of the UIs 204A-C (or the specified period of time has elapsed), the model 210 can indicate that the application 202 is now in application state 304 ("select user"). The view model module 208 can provide data and/or a request to the view modules 206A-C that indicates a configuration of the view to be rendered by the UIs 204A-C. The UIs 204A-C can then provide respective views of the application state 304 "select user". In the application state 304 the user can be prompted to identify himself, such as by providing a username or other identification. The identification can be provided verbally to a microphone of the UI 204B or through a user entering the information using a keyboard, selecting a user from a list of users presented using the UI 204A or 204C, or scanning a code using the barcode scanner.

In response to a valid username being entered, the next application state 306 (i.e. "enter password") can be entered, such as by the view module 206A-C providing data indicating the user to the view model module 208 which can then update the model 210. The model 210 can then indicate to the view model module 208 what the next application state is, which in the example of FIG. 3 is the "enter password" application state 306. The view model module 208 can provide data and/or requests to the view module(s) 206A-C to cause them to render respective views of the application state on the UIs 204A-C. This process can continue so that the remaining application states, perform tasks 308 and logout 310, can be viewed and interacted with by a user.

If one of the UIs 204A-C is deactivated (e.g., disabled or powered off) the remaining active UIs can be interacted with to alter the application state. Using the system 200, the application 202 can operate independent of the number or type of primary UIs 204A-C coupled to the application 202. Any UI can be coupled to the application 202 as long as a corresponding view module is coupled to the view model module 208 to drive the UI. Such a configuration allows for a variety of new and different UIs to be coupled to the application to provide views of the application state.

An application developer can configure a workflow activity manager module to enable or disable a view for each application state and define the view module(s) and view model module(s) associated with the application stat. A workflow activity is used to configure which view model module and view(s) is associated with a given application state. The view model module is independent of the view modules that are coupled thereto. The workflow activity manager can provide data to cause the view module 206A-C to enable/disable the associated view provided by the primary UI 204A-C coupled to the respective view module 206A-C. Thus, one or more views of the application state may persist across application state changes while one or more views may be disabled in response to an application state change. For example, a voice dialogue view can persist through an application state change, while a visual view may be disabled in response to the application state changing, or vice versa. If a view is disabled, the user can no longer alter the application state through interacting with the primary UI 204A-C associated with that disabled view.

The view provided by a primary UI 204A-C may persist (i.e. may not change) across an application state change while a view provided by another primary UI 204A-C may change across the same application state change. For example, using an application that includes filling out a form that includes multiple fields to be filled in by the user, the visual view of the form can persist across an application state change while the dialogue view of the application state changes across the same application state change or vice versa.

Figure 5:
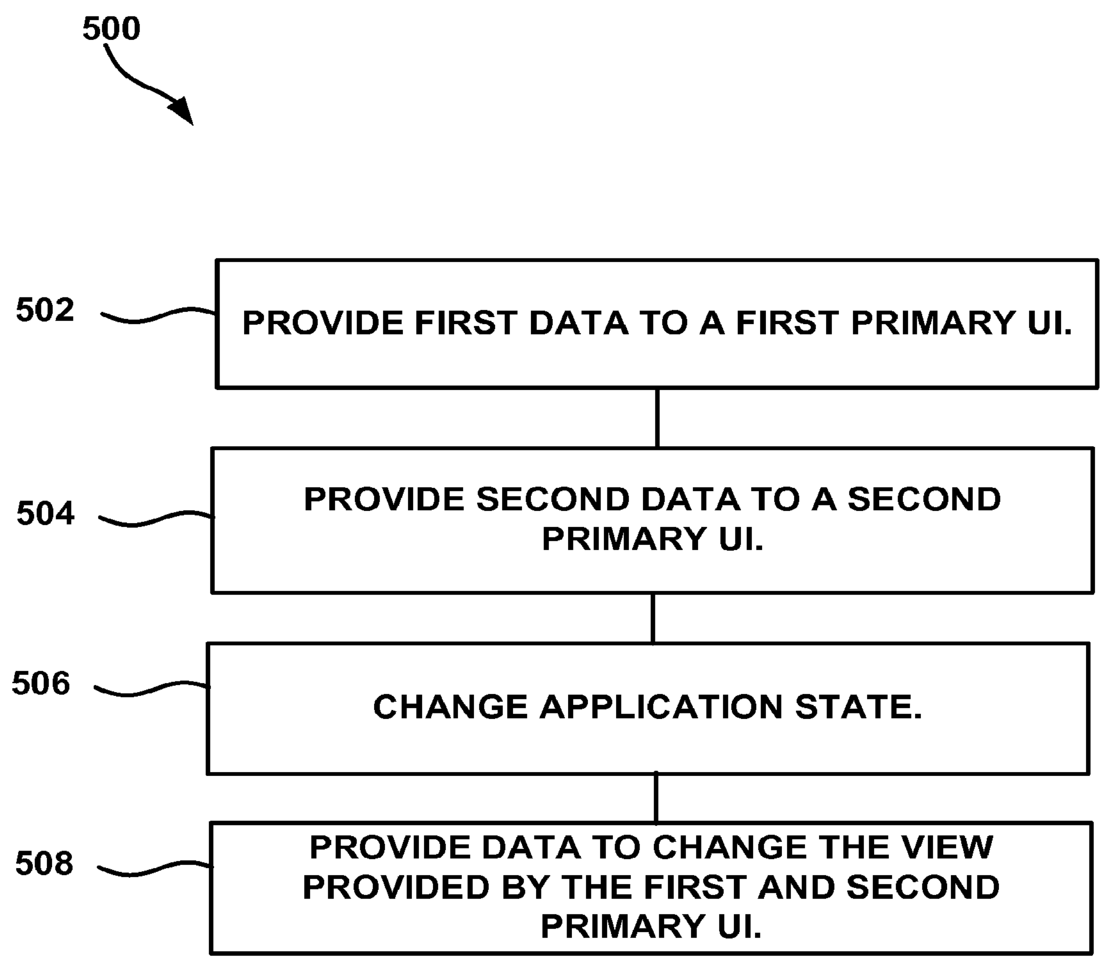
FIG. 5 illustrates, by way of example, a flow diagram of an embodiment of a method of using a multi-view system.

FIG. 5 illustrates, by way of example, a flow diagram of an embodiment of a method 500 of using a multi-view system, such as the system 200. The method 500 as illustrated includes: providing first data to a first primary UI at operation 502; providing second data to a second primary UI at operation 504; changing an application state at operation 506; and providing data to change the view provided by the first and second primary UIs at operation 508. The operation at 502 can be accomplished using the view module 206A-C. The view module 206A-C can provide data to the first primary UI 204A-C that causes the first primary UI to provide a first view of an application state of a software application. The operation at 504 can be accomplished using a second view module 206A-C. The second view module 206A-C can send data to the second primary UI 204A-C that causes the second primary UI 204A-C to provide a second view of the application simultaneously with the first view.

The operation at 508 can be performed in response to the operation at 506 being performed. The operation at 506 can be performed by the model 210 using application logic to update the application state and providing the updated application state to the view model module 208. The operation at 508 can be accomplished by providing data, from the first and second view modules 206A-C and to the first and second primary UIs 204A-C that causes the first and second primary UIs to provide views of the updated application state. The view provided by the second primary UI 204A-C (i.e. the second view) can be provided simultaneously with the view provided by the first primary UI 204A-C (i.e. the first view).

The method 500 can include providing, such as by using a third view module 206A-C, third data to a third primary UI 204A-C that causes the third primary UI 204A-C to provide a third view of an application state of a software application simultaneously with the first and second views. The method 500 can include providing, in response to changing the application state, data to the third primary UI 204A-C (i.e. from the third view module 206A-C) to cause the third primary UI to provide a third view of the new application state simultaneously with the first and second views.

The views (i.e. the views provided by the first, second, and/or third primary UIs 204A-C) can include a visual view and/or a voice dialogue view. A visual view can be provided by a UI that includes a display. An input mechanism, such as a keyboard, scanner, or touch screen, can be used to receive information from a user interacting with the UI that provides a visual view. A voice dialogue view can be provided by a UI that includes a speaker. An input mechanism, such as a microphone and a voice recognition module, can be used to receive information from a user interacting with the UI that provides the voice dialogue view.

The method 500 can include receiving at the view model module 208 data entered using the first primary UI 204A-C. The method 500 can include providing data to the first and/or second primary UIs 204A-C (i.e. using the first and/or second view modules, respectively) so that the data received from the first primary UI 204A-C is presented in the second view (e.g., simultaneous with the data being presented in the first primary UI 204A-C). The method 500 can include deactivating the first primary UI 204A-C, such as by a user actively deactivating (e.g., powering off) the primary UI 204A-C or the application changing application state and the view model module 208 deactivating the view module 206A-C communicatively coupled to the primary UI 204A-C. The method 500 can include, in response to receiving data indicative of second data and a second command from a user interacting with the second primary UI 204A-C, changing the application state.

Stack Handling

Using a system with multiple primary UIs, the navigation stack of the UIs may operate differently than in a system that includes the one-to-one relationship between the application state and the UI view. Consider a multiple primary UI system where one of the primary UIs is a voice dialogue view and a "back" button is pressed. Using a navigation stack that saves only previous screen views, the navigation stack will cause a UI to provide a previous screen view, but not a repeat of a previous voice dialogue view. A different navigation stack handling technique can be used to help overcome this issue. A different stack handling technique can help the multiple primary UIs remain in synchronization.

Figure 6:
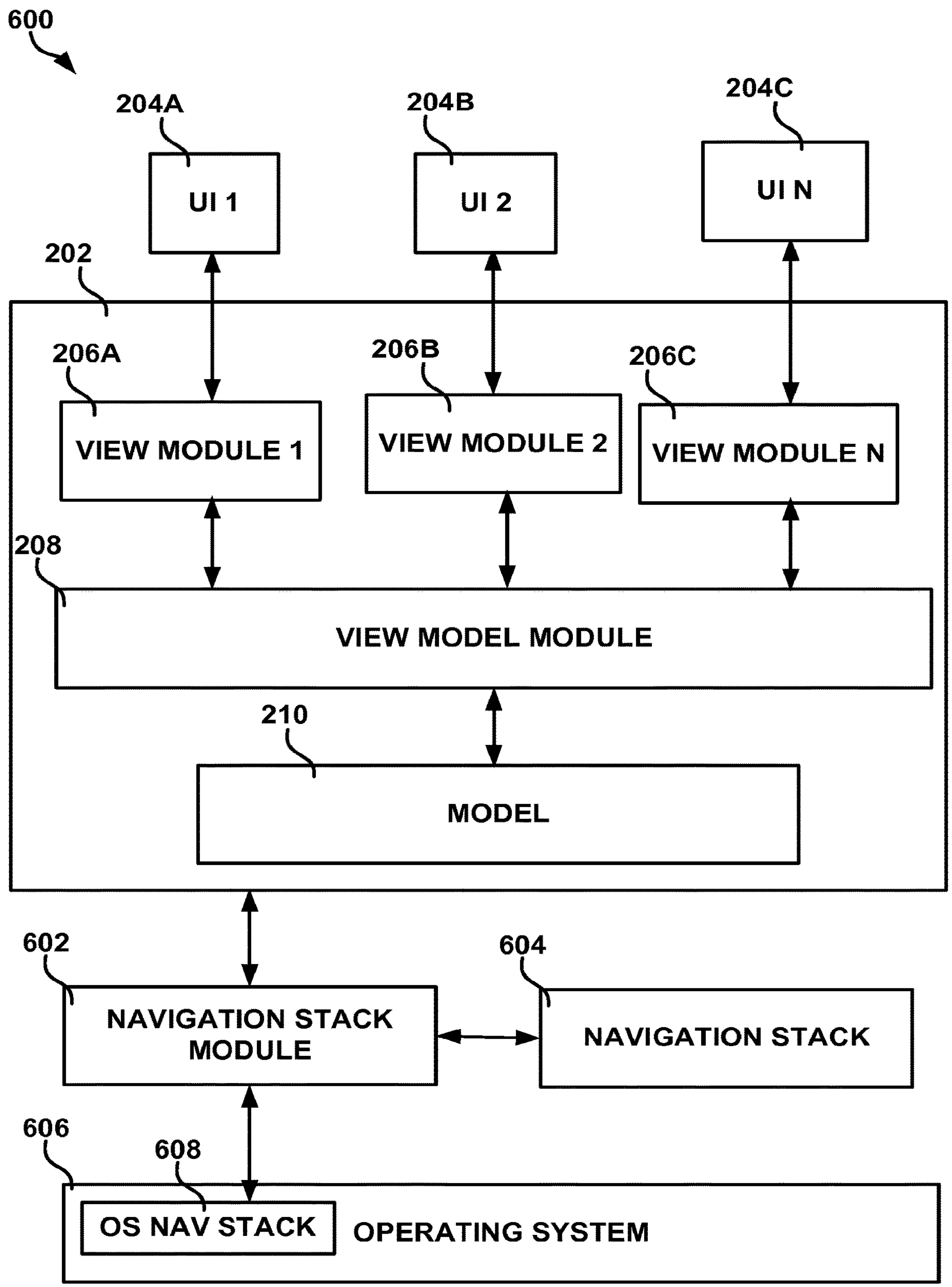
FIG. 6 illustrates, by way of example, a block diagram of an embodiment of a multi-view system.

FIG. 6 illustrates, by way of example, a block diagram of an embodiment of a system 600, including multiple primary UIs 204A-C. The system 600 can be similar to the system 200 with the system 600 including a navigation stack module 602, a navigation stack 604, and an operating system (OS) 606 including an OS navigation stack 608. The navigation stack module 602 can manage the entries in the navigation stack 604 and the OS navigation stack 608. The navigation stack module 602 can push and pop entries onto and off of the navigation stack 608 and the OS navigation stack 608.

The navigation stack 604 can be configured to store a workflow activity as an entry thereon. A "workflow activity" as used herein includes data corresponding to a configuration of the view model module 208 and a list of views associated with the configuration. The data causes the view model module 208 to perform one or more operations that causes the plurality of views to be presented on the multiple primary UIs 204A-C in response to the data being loaded on in the view model module 208. The data, in response to being loaded in the view model module 208, causes the view model module to provide data and/or a request to the view module(s) 206A-C to cause the view modules 206A-C to render a view on the primary UI 204A-C.

Figure 7:
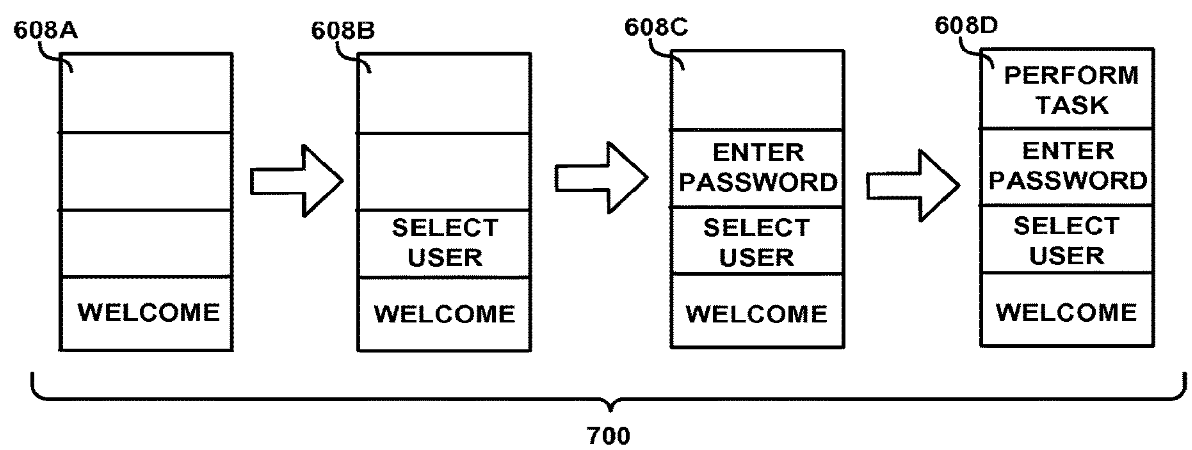
FIG. 7 illustrates a flow diagram of operating system stacks using the system to execute an application

The OS navigation stack 608, which may not be present in all OSs, stores screen views displayed on a screen of an apparatus, such as a mobile device. FIG. 7 illustrates a flow diagram of operating system stacks 700 using the system 100 to execute an application, such as an application that includes the application states as shown in FIG. 3. In a system that includes a one-to-one relationship between an application and a primary UI, such as the system 100, the navigation stack can be designed to only handle the previously presented screens using the UI. For example, as shown in FIG. 7, the OS navigation stack 608A reflects the state of the OS navigation stack 608 after the application 102 has been initialized and the welcome application state 302 has been entered. After the select user application state 304 is entered, the select user screen view can be pushed onto the stack, such as shown in the OS navigation stack 608B. If a user were to press the back button at this point, the stack would be in the state as shown in the OS navigation stack 608A by popping the select user entry off the stack 608B. The UI 104 would then show the view associated with the welcome application state 302 of the application 102.

The OS navigation stack 608C reflects the state of the OS navigation stack 608 after an enter password entry has been pushed on the stack 608B. The OS navigation stack 608D reflects the state of the OS navigation stack 608 after a perform task entry has been pushed on the stack 608C. In general, if a user navigates to the previous screen, the last entry in the stack is popped off and the entry prior the operation that was popped is reflected using the UI 104.

As was previously discussed, if a voice dialogue view or other view is added as another primary UI, the OS navigation stack is not able to reactivate the previous voice or other view. Without a new approach to this stack methodology, it can be difficult if not impossible to keep the primary UIs in synch as the application state is changed, such as by a user navigating to a previous view or interacting with the application to change the application state. By capturing an application state change in a framework layer between the OS layer and the application layer and managing the OS navigation stack 608 and the navigation stack 604 from the framework layer.

The navigation stack module 602 manages the workflow activities stored on the navigation stack 604 and also overrides the OS navigation stack 608 to maintain consistency between the views provided the OS navigation stack 608 and the views of the UI 204A-C. The navigation stack module 602 can reside in the framework layer and manage the stacks.

In using multiple primary UIs 204A-C the navigation stack module 602 can maintain the stack (i.e. the navigation stack 604 and/or the OS navigation stack 608) such that each view provided by the primary UIs 204A-C are consistent with each other and the application state. Consider a first primary UI that provides a visual view and a second primary UI that provides a voice dialogue view. If a user navigates backwards in the visual view, the voice dialogue view should also present its previous view, such as dialogue previously presented using the second primary UI.

Figure 8:
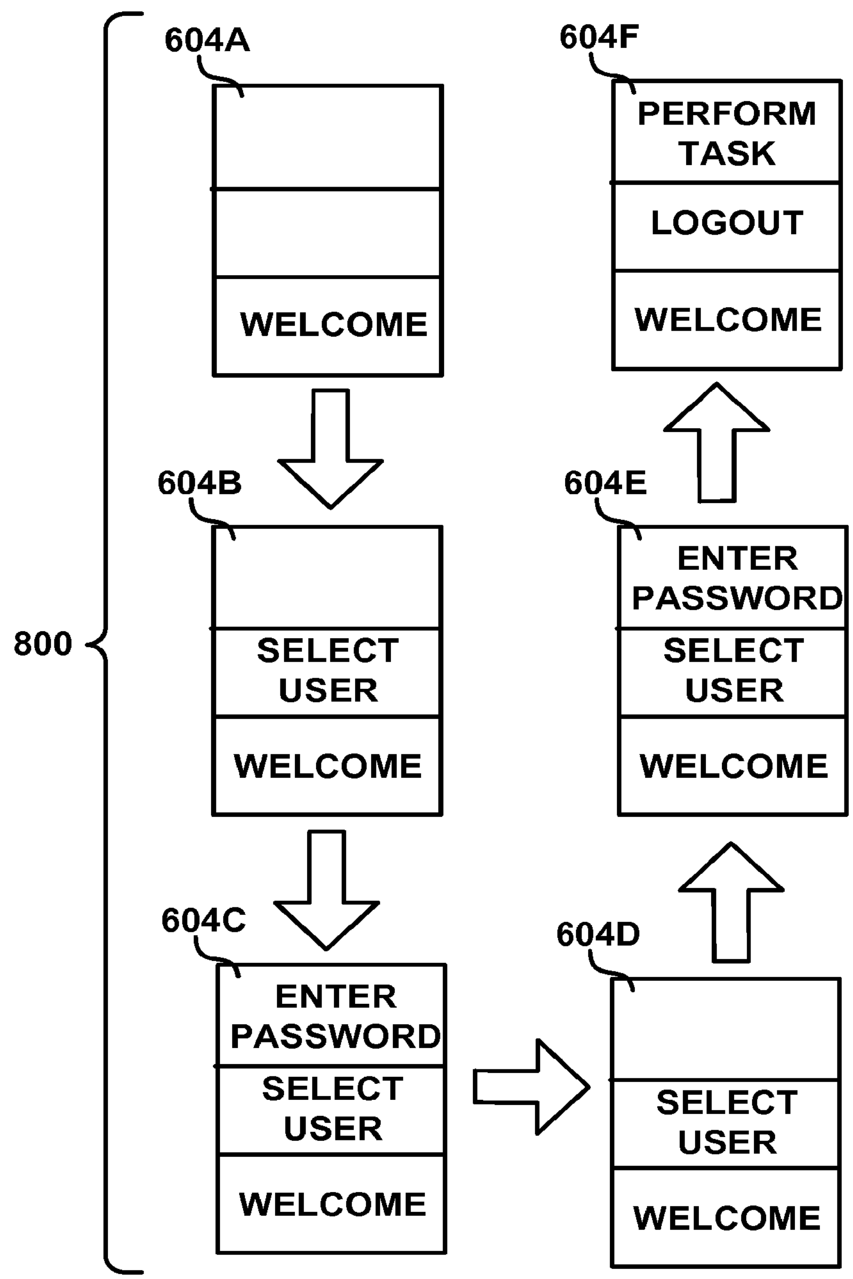
FIG. 8 illustrates, by way of example, a flow diagram of an embodiment of navigation stack states.
Figure 9:
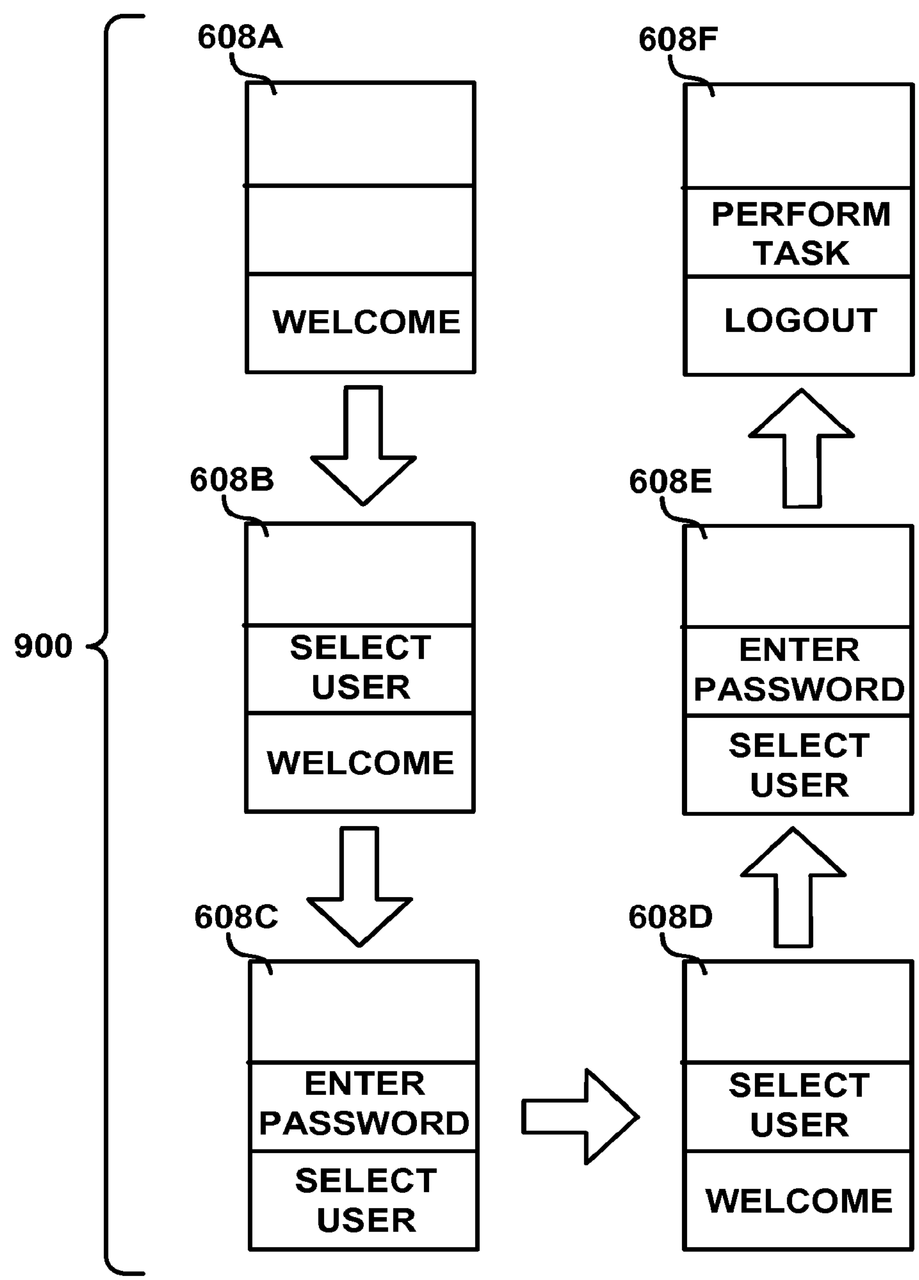
FIG. 9 illustrates, by way of example, a flow diagram of an embodiment of OS stack states.

FIGS. 8 and 9 illustrate, by way of example, flow diagrams of embodiments of navigation stack states 800 and corresponding OS navigation stack states 900 using the navigation stack module 602. FIGS. 8 and 9 show entries on the navigation stack 604 and the OS navigation stack 608 using an application that includes application states as shown in FIG. 3. The navigation stack module 602 manages the OS navigation stack 608A to be consistent with the navigation stack 604A, the OS navigation stack 608B to be consistent with the navigation stack 608B, and so on.

The navigation stack 604A and the OS navigation stack 608A show the stacks after the application 202 has entered the "welcome" application state 302. In response to the application state changing to the "select user" application state, a select user entry can be pushed onto the respective stacks 604A and 608A, such as shown in navigation stack 604B and OS navigation stack 608B. The navigation stack 604C and the OS navigation stack 608C show the stacks after the application 202 has entered the "enter password" state 306.

The OS navigation stack 608C includes only two entries at this point, namely "enter password" and "select user". The navigation stack module 602 can manage the entries on the OS navigation stack 608, such that at most two entries are on the OS navigation stack 608 for an appreciable amount of time. By keeping two or more entries on the stack, an animation or other transition between visual views of an application state can be displayed, such as to keep the user experience as a user might expect. The navigation stack module 602 can pop an entry off the OS navigation stack 608 and/or push an entry on the stack to manage the entries of the OS navigation stack 608. Note that not all OS 606 use OS navigation stacks. For example, iOS devices do not use a navigation stack. In such an instance, the navigation stack module 602 may only manage the navigation stack 604.

The navigation stack 604D and the OS navigation stack 608D show the stacks after the application 202 has returned to the "select user" application state 302. The OS navigation stack 608 can be managed, such that the current application state and another application state are stored as entries thereon at a given time. The OS navigation stack 608 can include an entry that corresponds to an application state that will be loaded in response to a user navigating to a previous application state using one or more of the primary UIs 204A-C.

In response to the application state changing back to the "enter password" application state 306, an enter password entry can be pushed onto the respective stacks 604D and 608D, such as shown in navigation stack 604E and OS navigation stack 608E. The navigation stack 604F and the OS navigation stack 608F show the stacks after the application 202 has entered the "perform task" state 308. The navigation stack module 602 can push an entry onto the respective stacks that corresponds to an application state that has yet been entered by the application 202 (at least in the current session of the application). The unperformed application state entry that was pushed on the respective stack in the example of FIGS. 8 and 9 are "logout" entries. If a user were to navigate to a previous screen while the application 202 is in the "perform task" application state 308, the logout entry would be loaded into the view model module 208 and the OS 606 to provide the "logout" application state 310 view using the UIs 204A-C.

In one or more embodiments, a visual view can provide an event-driven interface, while a dialogue view can be used for directed application navigation. For example, a visual view can list a series of questions to be answered by the user, while a voice dialogue view can provide the user with one question at a time. If the next question in the list is answered by the user using either of the voice dialogue view or the visual view, then the next question can be presented to the user using the voice dialogue view. In such a case, the voice dialogue view and the visual view can become out of sync. However, some rules may be defined to handle a case in which the user answers a question out of order using the visual view.

One or more synchronization techniques between the voice dialogue view and the visual view can help overcome the synchronization issue. Since a voice dialogue view generally focuses on one item at a time, the visual view can include a highlight of the current voice dialogue view application state being presented, such as to alert a user which application state the voice dialogue view is presenting. If the highlighted item is disposed of by the user using the voice dialogue view or the visual view, the next item in the list can be highlighted in the visual view and presented to the user in the voice dialogue view. This highlights an example of a visual view persisting in response to an application state change while a voice dialogue changes across the same application state change.

If the user disposes of a different item other than the highlighted item, then the view model module 208 can be configured to perform a variety of operations including one or more of: (1) disabling the voice dialogue view (e.g., temporarily disabling); (2) causing a sound to be provided to the user using the voice dialogue view, such as to indicate to the user that the previous item was disposed of out of order; (3) causing the voice dialogue view to present the highlighted application state to the user; and (4) causing the voice dialogue view to present the application state after the application state that was disposed of out of order in the list (or presenting a next application state not disposed of in the list after the application that was disposed, such as can include wrapping to the beginning of the list when the end of the list is reached). In one or more embodiments, the user can indicate via a voice keyword to re-synchronize with the other modes and/or which application state to synchronize at. An application developer can use a library application programming interface (API), for example, to specify how the application 202 and the navigation stack module 602 are to handle synchronization.

FIG. 10 illustrates, by way of example, an embodiment of a visual view 1000 of an application that includes a plurality of steps 1002A, 1002B, 1002C, 1002D, 1002E, 1002F, 1002G, 1002H, 1002I, and 1002J. Consider an application that includes a visual view that indicates to a user to perform the tasks (e.g., steps), such as the steps 1002A-J as shown in FIG. 10. In the example of FIG. 10, the user has completed steps 1002A-C and step 1002D is highlighted to be completed next. However, instead of completing step 1002D, the user has skipped to the step 1002H and completed that step out of order. The model 210 can be configured in a variety ways to handle such a situation. The model 210 can be configured to resume from an application state corresponding to the step 1002I, to the highlighted step 1002D, or can be configured to pause and not update the voice views until the user finishes all the steps, provides a voice command or otherwise resumes the application, such as by activating a button on a visual view, or a specified period of time has passed.

A sound indicating that the user has performed a task out of order can be presented to the user, such as through a voice dialogue view. If the user were to complete the step 1002J out of order, the model 210 can be configured to update the application state to resume at the step 1002D (e.g., wrapping around to the next uncompleted step). A user can provide a keyword command, such as “skip”, that causes data to be sent to the model to update the application state to cause the view model to load the view associated with presenting the next step in the application.

In one or more embodiments, the navigation stack module 602 can manage the navigation stack 604 and/or the OS navigation stack 608 such that at any point in the application state “performing tasks”, such as those described with regard to FIG. 10, the logout screen can be presented in response to a user navigating backwards using any of the multiple primary UIs 204A-C. In one or more other embodiments, the navigation stack module 602 can manage the navigation stack 604 and/or the OS navigation stack 608 such that at any point in the application state of performing tasks, the task most recently completed can be reflected as not completed in the primary UI(s) 204A-C and re-presented to the user. In such embodiments, if no tasks have been completed, the navigation stack 604 and the OS navigation stack 608 can be managed such that a logout application state is loaded into the view model module 208 and then the welcome application state is loaded into the view model module 208.

Figure 11:
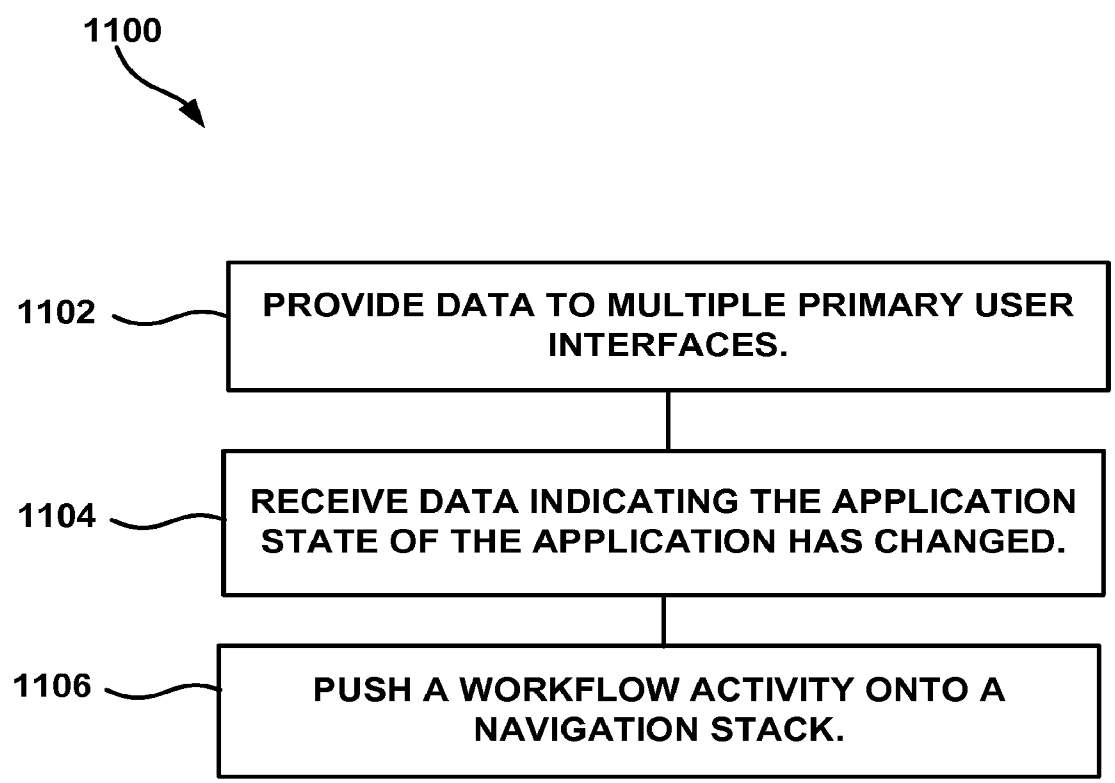
FIG. 11 illustrates, by way of example, a flow diagram of an embodiment of a method of handling one or more stacks.

FIG. 11 illustrates, by way of example, a flow diagram of an embodiment of a method 1100 of handling one or more stacks. The method 1100 as illustrated includes: provide data to multiple primary UIs (e.g., the UIs 204A-C), at operation 1102; receiving data indicating the application state of the application has changed, at operation 1104; and pushing a workflow activity onto a navigation stack, at operation 1106. The data provided at operation 1102 can be provided using a view model module of a software application. The data provided at operation 1102 can cause each of the multiple primary UIs to present a view of an application state of the software application. The data received at operation 1104 can be received at the view model module 208 (e.g., from the model 210). The operation at 1106 can be performed in response to performing the operation at 1104. The operation at 1106 can be accomplished using a navigation stack module 602 communicatively coupled to the software application 202. Each workflow activity can include data corresponding to a configuration of the view model module 208 and a list of views associated with the configuration. The data of the workflow activity can cause the view model module 208 to provide the data that causes the plurality of views to be presented on the multiple primary UIs in response to the configuration being loaded on in the view model module 208.

The method 1100 can include storing visual views to be presented using a display of the apparatus on an OS navigation stack 608 communicatively coupled to the navigation stack module 602. The method 1100 can include managing the OS navigation stack 608, using the navigation stack module 602, to keep the OS navigation stack 608 consistent with the navigation stack. The method 1100 can include, wherein managing the OS navigation stack 608 to keep the OS navigation stack 608 consistent with the navigation stack 602 includes managing (using the navigation stack module 602) the OS navigation stack 608 such that at most two visual view entries are stored on the OS navigation stack 608. The method 1100 can include, wherein managing the OS navigation stack 608 includes managing (using the navigation stack module 602) the OS navigation stack 608 so that the visual views of the OS navigation stack 608 are visual views from corresponding workflow activities and the visual views are stored on the OS navigation stack 608 in the same order as the corresponding workflow activities are stored on the navigation stack 604.

The method 1100 can include popping (using the navigation stack module 602) a workflow activity onto the navigation stack 604 that was not previously performed by the application 202 in response to the application state changing. Popping the workflow activity on the navigation stack 604 that was not previously performed includes popping a logout workflow activity on the navigation stack 604.

The method 1100 can include receiving data indicating that a user is navigating to a previous workflow activity (using the primary UIs 204A-C). The operation at 1106 can include pushing the workflow activity onto the navigation stack that was not previously performed, in response receiving the data indicating that the user is navigating to the previous workflow activity.

Application Development

Figure 12:
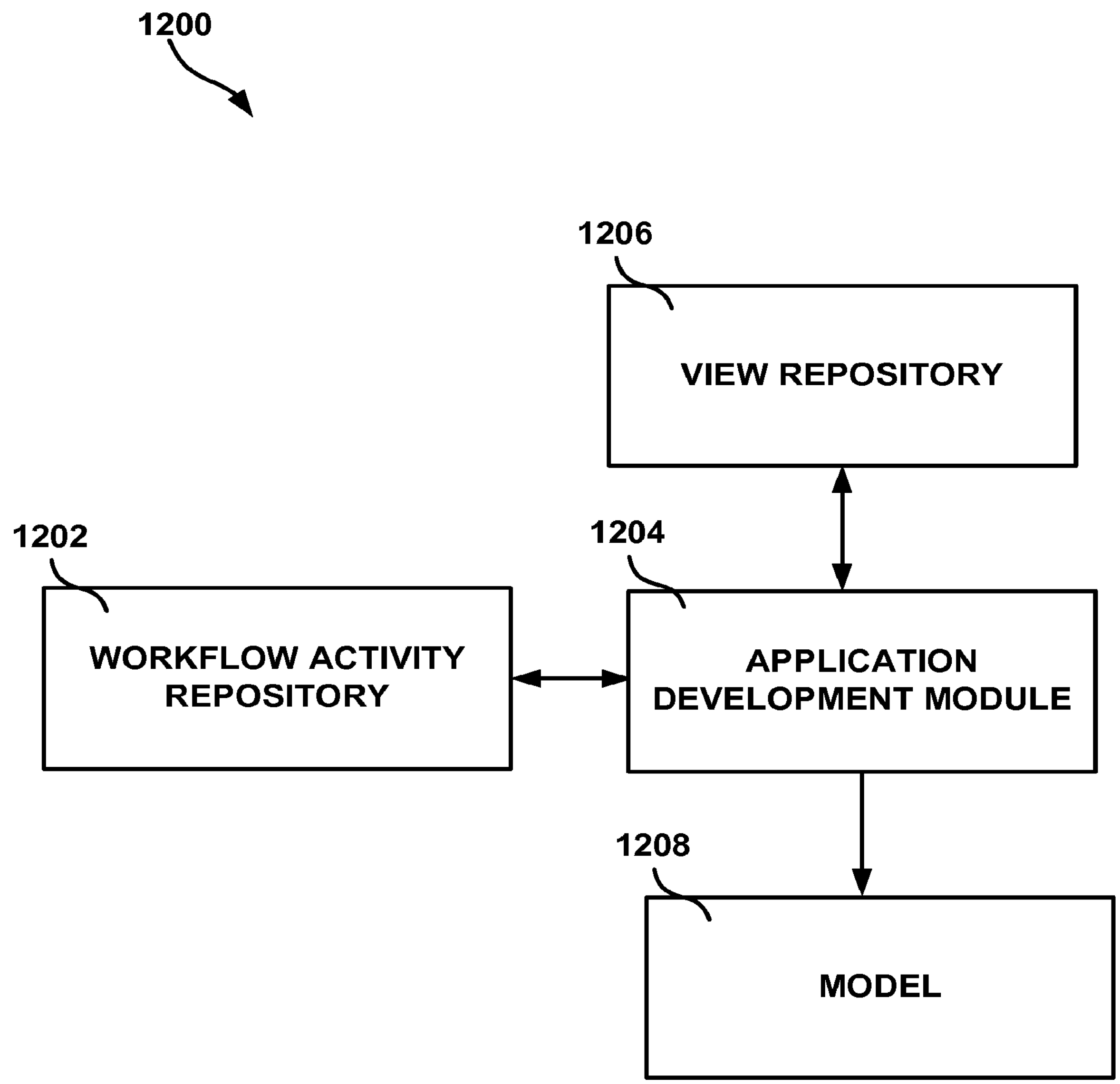
FIG. 12 illustrates, by way of example, a block diagram of an embodiment of a system for application development.

FIG. 12 illustrates, by way of example, a block diagram of an embodiment of a system 1200 for application development. The system 1200 as illustrated includes a workflow activity repository, an application development module 1204, a view repository 1206, and an application model 1208.

The workflow activity repository 1202 can include an organized store of workflow activities that are available to a user in building a multi-primary UI application. The view repository 1206 can include an organized store of views that are available to be associated with a workflow. The workflow activity repository 1202 and the view repository 1206 can be stored remote or local to the application development module. The workflow activity repository 1202 and the view repository 1206 can provide an asset store of workflow activities and views that can be wired together and or associated with one another to build workflow-based applications for any platform and with arbitrary views.

The workflow activities of the workflow activity repository may be linked to other workflow activities, allowing an application to be described by chaining together workflow activities. A new workflow activity may be created and stored on the workflow activity repository 1202, such as by an application developer using a software library description of possible aspects of the workflow activities. Each workflow activity can include logic and views for each supported platform associated therewith. A workflow activity may be used in more than one application. Linking workflow activities with transitions and views can provide an application developer a way to create an application.

The application development module 1204 can receive data indicating the selected workflow activities and views to associate with those workflow activities (as specified by a user) and produce the application model 1208 using the received data. The application model 1208 can be loaded into the model 210, such as to provide the functionality as specified by the user in developing the application model 1208. The application model 1208 can define application states so as to indicate state transitions. The state transitions can be dependent on a user interaction with a primary UI, such as a user speaking or typing a specific phrase or scanning a specified object, for example.

The application model 1208 can be bound to a primary UI at build time or run time. Using such a configuration can allow a variety of different UIs to be bound to the application. Such a configuration can cause the application model 1208 to build or run differently on different builds or runs. For example, if a first mobile device is being used as a primary UI, the application model 1208 can be built or run differently than if a different mobile device is being used as the primary UI. The different runs or builds can account for differences in the different primary UIs that can be connected to the application. In this manner, the workflow activities can be independent of the presentation layer of the application (i.e. the primary UIs), the modes of input and/or output, the platform running the primary UIs, and/or the other workflow activities. By binding the application to the presentation layer at run or build time, the different primary UIs can be used together or independently to alter an application state of the application. The application model 1208 produced by the application development module can include data defining an application including workflow activities, state transitions between workflow activities, and the associated presentation layer views. The data can be logged in a document that may or may not be editable, such as an XML or a Java Script Object Notation (JSON) document. This document can be considered an "intermediate representation". An application developer can edit the intermediate representation document to alter the application. Such a configuration can help simplify business workflow application development. The XML document data can be converted into code and compiled further simplifying the application development process.

Figure 13:
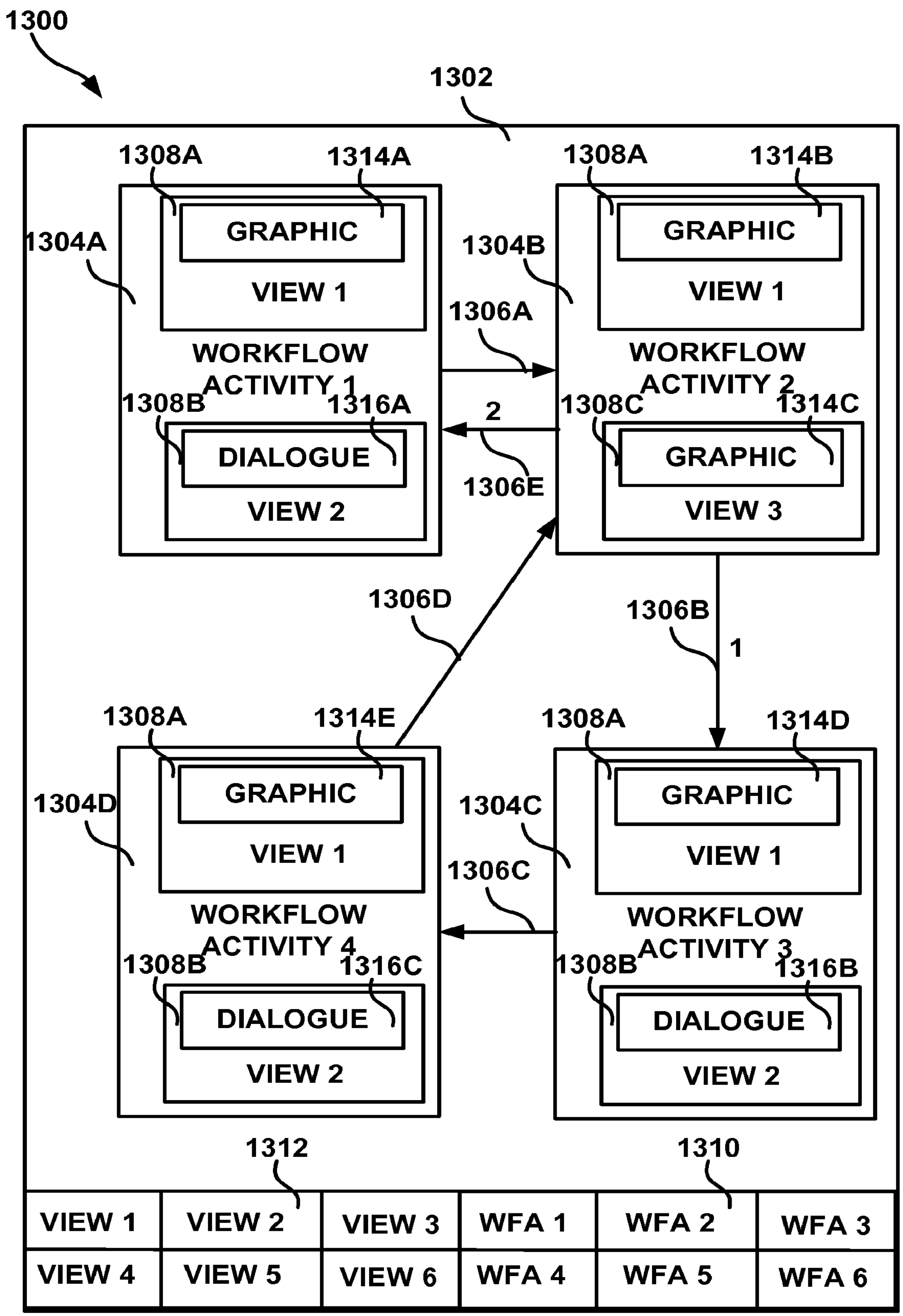
FIG. 13 illustrates, by way of example, a block diagram of an embodiment of a UI for application development.

FIG. 13 illustrates, by way of example, a block diagram of an embodiment of a UI 1300 that can be presented to a user developing a multi-primary UI application. The UI 1300 can include a workbench 1302 on which a user can organize workflow activities 1304A, 1304B, 1304C, and/or 1304D, define connections 1306A, 1306B, 1306C, 1306D, and/or 1306E between the workflow activities 1304A-D, and associate views 1308A, 1308B, and/or 1308C with the workflow activities 1304A-D. The workbench 1302 can include a list of available workflow activities 1310 and/or a list of views 1312 that can be associated with a workflow activity.

The Workflow Activities (WFAs) can be objects representing a given workflow activity, such that a user can select a WFA object from the available workflow activities 1310 and drag and drop the WFA object onto the workbench 1302. The user can then define the connections 1306A-E between workflow activities 1304A-D on the workbench 1302. The connections 1306A-E can indicate state transitions between workflow activities 1304A-D. For example, the connection 1306A indicates that the application is to transition from workflow activity 1304A to 1304B in response to some event occurring in the workflow activity 1304A, such as the workflow activity 1304A being completed. The connection 1306B indicates that the application is to transition from workflow activity 1304B to 1304C in response to the workflow activity 1304B being completed the first time. The connection 1306E indicates that the application is to transition from workflow activity 1304B to 1304A in response to the workflow activity 1304B being completed a second time.

The views in the available views 1312 can be objects representing a given view, such that a user can select a view object from the available views 1312 and drag and drop the view object onto a workflow activity 1304A-D to associate the view with the workflow activity. The views 1308A-C can include visual views, voice dialogue views, printer views, or other views that can be rendered on a primary UI. The views 1308A-C can be configurable, such that a user can define what is presented to a user when the associated workflow activity is performed. For example, if a view is a visual view, such as the view 1308A-C, the user can associate a graphic 1314A, 1314B, 1314C, 1314D, and/or 1314E (e.g., a picture, text, or a combination thereof, among others) with the view to define what is presented to a user when the corresponding workflow activity is presented. In another example, if a view is a voice dialogue view, the user can associate a dialogue 1316A, 1316B, and/or 1316C (e.g., text, a sound snippet, a recording, or a combination thereof, among others) that can be presented to the user when the corresponding workflow activity is presented. For example, when the workflow activity 1304A is presented to the user, the graphic 1314A and the dialogue 1316A can be presented to the user simultaneously. An input box can be presented to a user in response to a user selecting (e.g., touching on a touch screen, clicking using a mouse, hovering and pressing a button) the workflow activity 1304A-D, the graphic 1314A-E or the dialogue 1316A-C. The user can then select a graphic, sound snippet, or enter text into the input that can be presented using the associated view.

The application model 1208 (e.g., the model 210) can include data defining the transitions between the workflow activities (i.e. application states). The view model module 208 can include data defining the views associated with the workflow activities defined by the user, such that if the model 1208 indicates to transition to workflow activity 1304C, the view model module 208 knows what views are associated with the workflow activity 1304C and can provide data to the view module 206A-C that causes the view module 208 to render a view on a primary UI 204A-C coupled thereto. The navigation stack module 602 can push and/or pop activities onto or off of the navigation stack 604 and/or the OS navigation stack 608 so that the stacks remain consistent with the developed application. For example, if a developer has indicated that if a user navigates to a previous screen while workflow activity 1304C is being performed then workflow activity 1304B is presented, then the stack can manage the entries on the stack(s) to include the workflow activity 1304B below the workflow activity 1304C on the stack(s).

The application model 1208 produced can include default rules that may or may not be overridden by a developer. For example, a default rule can include that when performing a workflow activity and a user navigates to a previous screen the previous workflow activity can be displayed or a logout workflow activity can be displayed. Other default rules can include the application model 1208 including a welcome, a user name, and/or a password workflow activity on startup.

Figure 14:
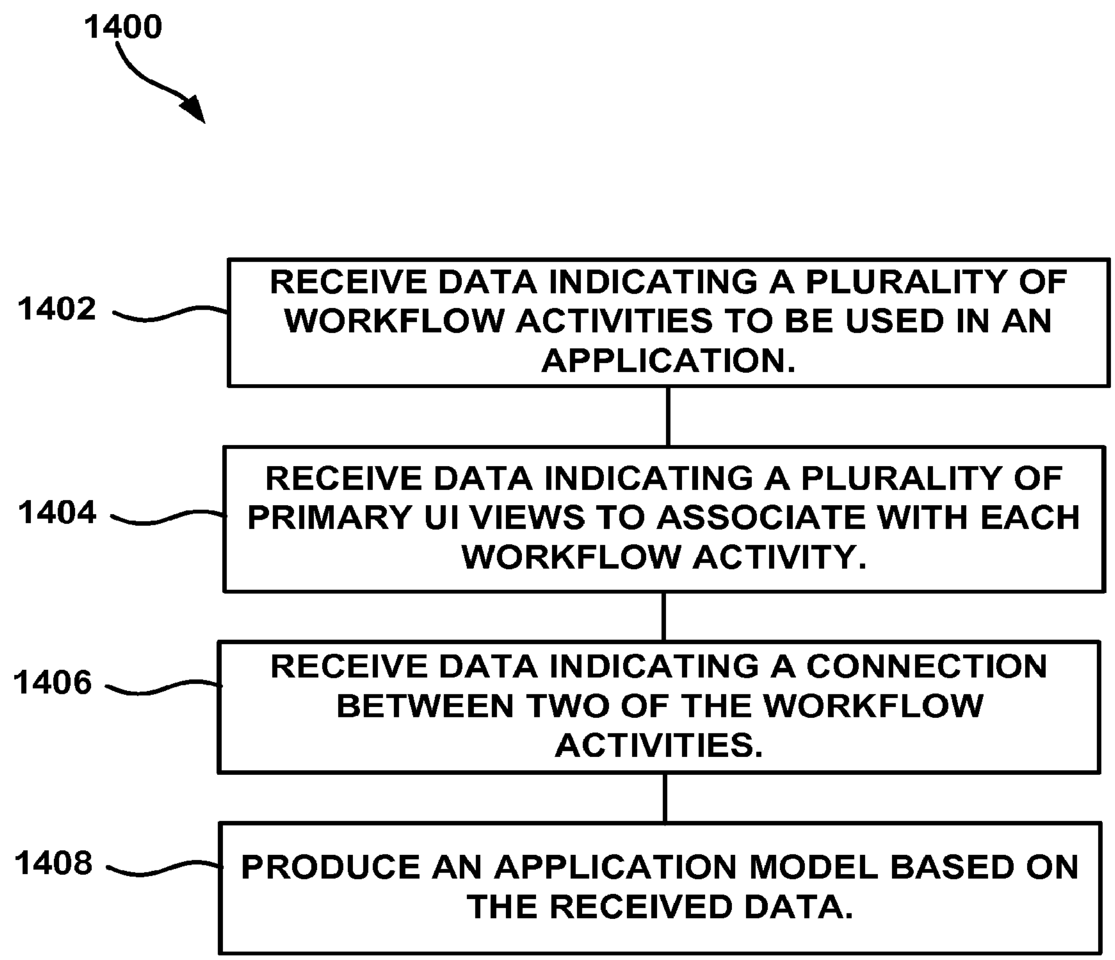
FIG. 14 illustrates, by way of example, a flow diagram of an embodiment of a method for application development.

FIG. 14 illustrates, by way of example, a flow diagram of an embodiment of a method 1400 of application development. The method 1400 as illustrated includes: receiving data indicating a plurality of workflow activities to be used in an application, at operation 1402; receiving data indicating a plurality of primary UI views to associate with each workflow activity, at operation 1404; receive data indicating a connection between two of the workflow activities of the plurality of workflow activities, at operation 1406; and producing an application model based on the received data, at operation 1408.

The method 1400 can include presenting the plurality of workflow activities as objects that the user drags and drops onto a workbench of the application development environment and wherein the application development environment is configured to allow the user to draw the connections between objects on the workbench. The operation at 1408 can include producing an extensible markup language (XML) document description of the application model. The document description of the application model can be in another format other than XML, such as JSON. The document description of the application model can be in a machine-readable format. The method 1400 can include binding the application model to a plurality of primary UIs at run time or build time. The run or build of the application model can be different for different primary UIs.

The method 1400 can include receiving data indicating a first view to be associated with a first workflow activity of the plurality of workflow activities and receiving data indicating a second view to be associated with the first workflow activity such that the first view and the second view are presented simultaneously in response to the workflow activity being performed. The method 1400 can include receiving data indicating a dialogue to be associated with a voice dialogue view of a first workflow activity of the plurality of workflow activities and receiving data indicating a text or a graphic to be associated with a visual view of the first workflow activity such that the visual view and the voice dialogue view are presented simultaneously when performing the workflow activity. The method 1400 can include compiling the application model and/or loading the application model into an application.

As used herein, "automatically" means without human input or interference after deployment. For example, the view model module automatically providing data to the view modules that causes the view modules to render a view of a workflow activity on a primary UI means that the view model module accomplishes these tasks without human input or interference after the view model module is compiled and/or running. Any step of the methods discussed herein (e.g., the method 500, the method 1100, and/or method 1400 can be performed automatically).

Figure 15:
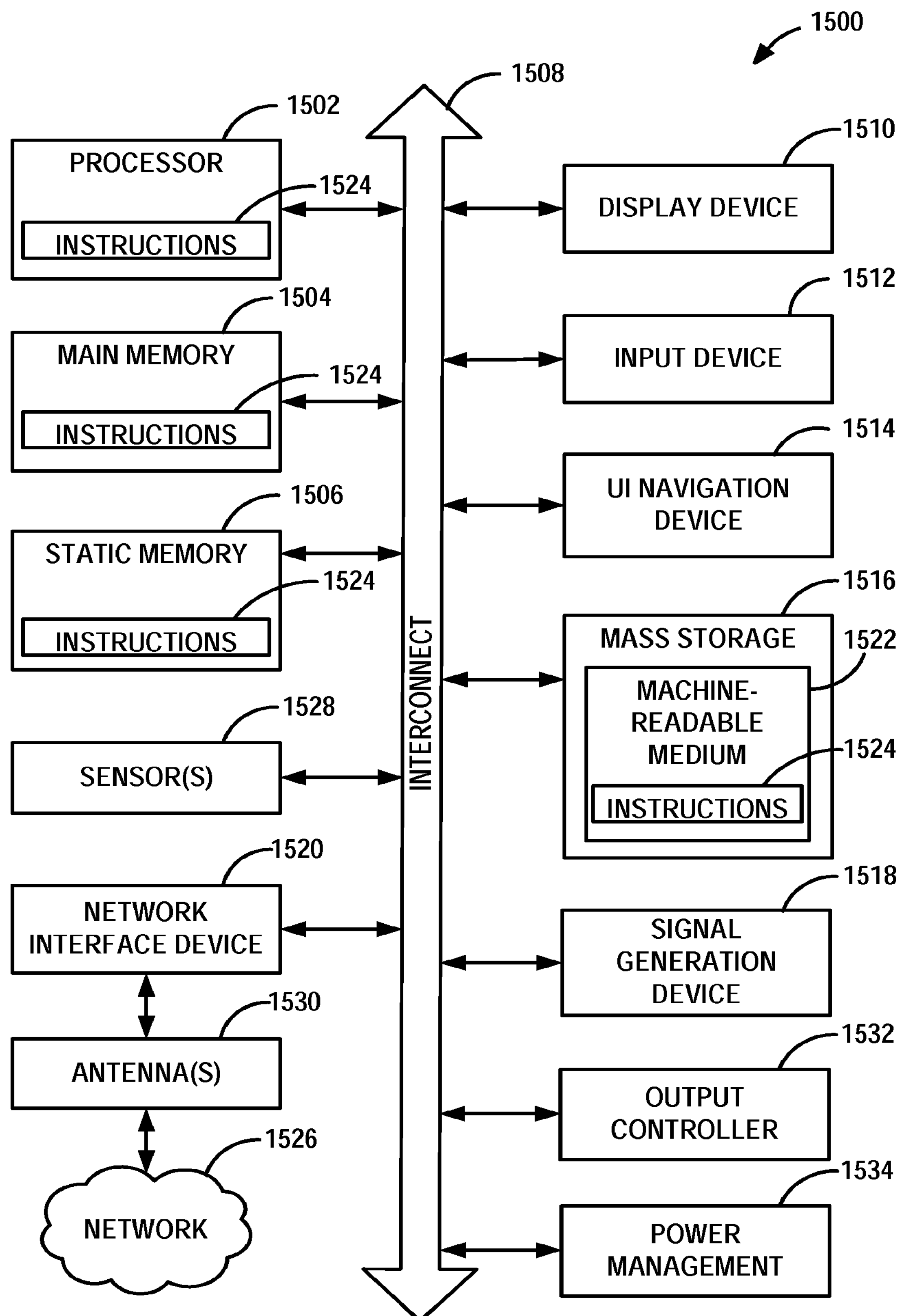
FIG. 15 illustrates, by way of example, a block diagram of an embodiment of a machine which may be used in performing one or more methodologies discussed herein.

FIG. 15 illustrates, by way of example, a block diagram of an embodiment of a machine 1500 upon which any one or more of the methods discussed herein may be performed. In one or more embodiments, the primary UIs 204A-C, the view module 206A-C, the view model module 208, the application model 210, the navigation stack module 602, the navigation stack 604, the OS 606, the OS navigation stack 608, the workflow activity repository 1202, the application development module 1204, the view repository 1206, and/or the application model 1208 can include one or more items of machine 1500. Machine 1500 can be embodied as a computing device, providing operations of the application 202, the primary UIs 204A-C, the view module 206A-C, the view model module 208, the application model 210, the navigation stack module 602, the navigation stack 604, the OS 606, the OS navigation stack 608, the workflow activity repository 1202, the application development module 1204, the view repository 1206, and/or the application model 1208 or any other processing or computing platform or component described or referred to herein.

In alternative embodiments, the machine 1500 operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine can be a personal computer (PC), such as a PC that can be portable (e.g., a notebook or a netbook) or a PC that is not conveniently portable (e.g., a desktop PC), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example machine 1500 can include a processor 1502 (e.g., a central processing unit (CPU), a graphics processing unit (GPU) or both), a main memory 1504 and a static memory 1506, which communicate with each other via an interconnect 1508 (e.g., a link, a bus, etc.). The machine 1500 can further include a video display unit 1510, an alphanumeric input device 1512 (e.g., a keyboard), and a user interface (UI) navigation device 1514 (e.g., a mouse). In one embodiment, the video display unit 1510, input device 1512 and UI navigation device 1514 are a touch screen display. The machine 1500 can additionally include a storage device 1516 (e.g., a drive unit), a signal generation device 1518 (e.g., a speaker), an output controller 1532, a power management controller 1534, or a network interface device 1520 (which can include or operably communicate with one or more antennas 1530, transceivers, or other wireless communications hardware), or one or more sensors

1528, such as a GPS sensor, compass, location sensor, accelerometer, or other sensor.

The storage device 1516 includes a machine-readable medium 1522 on which is stored one or more sets of data structures and instructions 1524 (e.g., software) embodying or utilized by any one or more of the methodologies or functions described herein. The instructions 1524 can also reside, completely or at least partially, within the main memory 1504, static memory 1506, and/or within the processor 1502 during execution thereof by the machine 1500, with the main memory 1504, static memory 1506, or the processor 1502 also constituting machine-readable media. The processor 1502 configured to perform an operation can include configuring instructions of a memory or other machine-readable media coupled to the processor, which when executed by the processor, cause the processor 1502 to perform the operation.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 1524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1524 can further be transmitted or received over a communications network 1526 using a transmission medium via the network interface device 1520 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes and Examples

The present subject matter can be described by way of several examples.

Example 1 can include or use subject matter (such as an apparatus, a method, a means for performing acts, or a device readable memory including instructions that, when performed by the device, can cause the device to perform acts), such as a workflow activity repository including a plurality of workflow activities stored thereon, wherein each workflow activity of the plurality of workflow activities includes data corresponding to a configuration of a view model module and a list of views to be associated with the configuration. The data causes the view model module to perform one or more operations that cause a plurality of views of the list of views to be presented on multiple primary user interfaces in response to the data being loaded into the view model module. An application development module is communicatively coupled to the workflow activity repository. The application development module is configured to cause a view of an application being built using the application development module to be displayed to a user. The application development module is configured to provide an environment in which a user defines connections between workflow activities of the plurality of workflow activities and produces an application model based on the user-defined connections and the workflow activities connected by the connections.

Example 2 can include or use, or can optionally be combined with the subject matter of Example 1 to include or use, an application development module configured to cause a display to present the workflow activities as objects which the user can drag and drop onto a workbench and allow the user to draw connections between objects on the workbench.

Example 3 can include or use, or can optionally be combined with the subject matter of at least one of Examples 1-2 to include or use, an application development module configured to produce an extensible markup language (XML) document or JSON document description of the application model.

Example 4 can include or use, or can optionally be combined with the subject matter of at least one of Examples 1-3 to include or use, an application model configured to be bound to a primary user interface at run time or build time, and a run or build of the application model is different for different primary user interfaces.

Example 5 can include or use, or can optionally be combined with the subject matter of at least one of Examples 1-4 to include or use, one or more workflow activities of the plurality of workflow activities that are configurable so that a user configures a dialog to be presented using a voice dialogue view and text or a graphic to be presented using a visual view simultaneous with the voice dialogue view.

Example 6 can include or use, or can optionally be combined with the subject matter of at least one of Examples 1-5 to include or use, a view repository communicatively coupled to an application development module, wherein the environment further allows a user to associate one or more views with a workflow activity, wherein each view module defines a type of view to be provided in response to the workflow activity being performed.

Example 7 can include or use, or can optionally be combined with the subject matter of at least one of Examples 1-6 to include or use, a plurality of workflow activities that include platform, view, user interface, and application independent.

Example 8 can include or use subject matter (such as an apparatus, a method, a means for performing acts, or a device readable memory including instructions that, when performed by the device, can cause the device to perform acts), that can include or use receiving, at an application development environment, data indicating a plurality of workflow activities to be used in an application, each of the workflow activities including data corresponding to a configuration of a view model module and a list of views to be associated with the configuration; and receiving, at the application development environment, data indicating a plurality of primary user interface views to associate with each of the workflow activities; and receiving, at the application development environment, data indicating a connection between two of the workflow activities of the plurality of workflow activities; and producing an application model based on the received data indicating the plurality of workflow activities, the data indicates the connection between two of the workflow activities and the data indicating the plurality of primary user interface views.

Example 9 can include or use, or can optionally be combined with the subject matter of Example 8 to include or use, presenting the plurality of workflow activities as objects which the user can drag and drop onto a workbench of the application development environment and allow the user to draw the connections between objects on the workbench.

Example 10 can include or use, or can optionally be combined with the subject matter of at least one of Examples 8-9 to include or use, producing the application model includes producing an extensible markup language (XML) document description of the application model.

Example 11 can include or use, or can optionally be combined with the subject matter of at least one of Examples 8-10 to include or use, binding the application model to a plurality of primary user interfaces at run time or build time, and wherein a run or build, respectively, of the application model is different for different primary user interfaces.

Example 12 can include or use, or can optionally be combined with the subject matter of at least one of Examples 8-11 to include or use, receiving data indicating a first view to be associated with a first workflow activity of the plurality of workflow activities and receiving data indicating a second view to be associated with the first workflow activity such that the first view and the second view are presented simultaneously in response to the workflow activity being performed.

Example 13 can include or use, or can optionally be combined with the subject matter of at least one of Examples 8-12 to include or use, a first workflow activity that includes a voice dialogue view and a visual view, wherein the method further comprises receiving data indicating a dialog to be associated with the voice dialogue view and receiving data indicating a text or a graphic to be associated with the visual view.

Example 14 can include or use, or can optionally be combined with the subject matter of at least one of Examples 8-13 to include or use, compiling the application model and loading the application model into an application.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in this document, the terms "first," "second," and "third," etc. are used merely as labels, and are not intended to impose numerical requirements on their objects.

From the foregoing, it will be observed that numerous variations and modifications can be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

To supplement the present disclosure, this application incorporates entirely by reference the following patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; U.S. Patent No. D702,237;
U.S. Pat. Nos. 8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;

8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; U8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;

U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Although a few embodiments have been described in detail above, other modifications are possible. For example, the logic flows depicted in the figures do not require the particular order shown, or sequential order, to achieve desirable results. Other steps can be provided, or steps can be eliminated, from the described flows, and other components can be added to, or removed from, the described systems. Other embodiments can be within the scope of the following claims.

The invention claimed is:

1. A system comprising:

a memory database communicatively coupled to a processor, the memory database comprising:

a workflow activity repository comprising a plurality of workflow activities stored thereon and configured to be used in an application comprising a plurality of application states, wherein respective workflow activities of the plurality of workflow activities are associated with respective application states of the plurality of application states, and wherein each workflow activity of the plurality of workflow activities comprises data corresponding to a configuration of a view model module and a list of views to be associated with the configuration of the view model module, the processor being configured to receive the data and instruct the view model module to perform an operation that causes:

a first view of the list of views to persist and to remain synchronized across a plurality of user interfaces, in response to an application state change of the application, and a second view of the list of views to change in response to the application state change of the application, wherein the first view comprises a highlighted portion to indicate the change in the second view in response to the application state change.

2. The system of claim 1, wherein the memory database further comprises:

an application development module communicatively coupled to the workflow activity repository, the processor being further configured to execute instructions from the application development module to cause a view of the application being built using the application development module to be displayed to a user, the application development module being configured to provide an environment in which the user defines connections between the workflow activities of the plurality of workflow activities and produce an application model based on user-defined connections and the workflow activities connected by the connections.

3. The system of claim 1, wherein at least one workflow activity of the plurality of workflow activities is configurable so that a user configures a dialog to be presented using a voice dialogue view and a text or a graphic to be presented using a visual view simultaneous with the voice dialogue view.

4. The system of claim 3, wherein the voice dialogue view persists through the application state change, while the visual view changes in response to the application state change and the application state changes in response to a change of the visual view.

5. The system of claim 4, wherein the voice dialogue view is presented to a user through a user interface that comprises a speaker and a microphone, and the visual view is presented to the user through the user interface that comprises at least one of a display, a keyboard, a printer that displays or prints, a monitor, or a barcode scanner.

6. The system of claim 1, further comprising a view repository communicatively coupled to an application development module that is configured to allow a user to associate the first view with a workflow activity, and a view module that defines a type of view to be provided in response to the workflow activity being performed.

7. The system of claim 1, wherein the plurality of workflow activities are at least one of platform independent, view independent, user interface independent, and application independent.

8. The system of claim 1, further comprising:

a navigation stack module to maintain a OS navigation stack such that each view provided by the plurality of user interfaces are consistent with each other and an application state, wherein the OS navigation stack comprises an entry that corresponds to the application state that will be loaded in response to a user navigating to a previous application state using at least one of the plurality of user interfaces.

9. A method comprising:

receiving, at an application development environment stored in a memory database, data indicating a plurality of workflow activities to be used in an application comprising a plurality of application states, wherein respective workflow activities of the plurality of workflow activities are associated with respective application states of the plurality of application states, and wherein each of the workflow activities comprises data corresponding to a configuration of a view model module and a list of views to be associated with the configuration of the view model module;

receiving, at the application development environment, data indicating a plurality of separate and independent user interface views to associate with each of the workflow activities;

receiving, at the application development environment, data indicating a connection between two of the workflow activities of the plurality of workflow activities;

producing with a processor coupled to the memory database, an application model based on the received data indicating the plurality of workflow activities, the data indicating the connection between the two of the workflow activities, and the data indicating the plurality of separate and independent user interface views; and configuring, with the processor, the application so that the application is executable by the processor for causing:

a first view of the list of views to persist and to remain synchronized across a plurality of user interfaces, in response to an application state change of the application, and a second view of the list of views to change in response to the same application state change of the application, wherein the first view comprises a highlight portion to indicate the change in the second view in response to the application state change.

10. The method of claim 9, further comprising receiving data indicating the first view to be associated with a first workflow activity of the plurality of workflow activities and receiving data indicating the second view to be associated with the first workflow activity such that the first view and the second view are presented simultaneously in response to the first workflow activity being performed.

11. The method of claim 10, wherein the first workflow activity comprises a voice dialogue view and a visual view, and wherein the method further comprises: receiving data indicating a dialog to be associated with the voice dialogue view and receiving data indicating a text or a graphic to be associated with the visual view.

12. The method of claim 11, wherein the voice dialogue view persists through the application state change, while the visual view changes in response to the application state change and the application state changes in response to a change of the visual view.

13. The method of claim 11, further comprising:

presenting the application that comprises the visual view that indicates to a user to perform a list of tasks, wherein when the user skips a task from the list of tasks, then to:

pause and not update voice views until the user finishes all the list of tasks; and provide a sound indicating that the user has performed a task out of order and present to the user, such as through the voice dialogue view.

14. The method of claim 9, further comprising:

providing first data to a first UI at operation;

providing second data to a second UI at operation; and changing an application state at operation and providing data to change the first and second views provided by the first and second UIs.

15. The method of claim 14, further comprising:

deactivating a view module communicatively coupled to the first UI and changing the application state with the second UI in response to receiving data indicative of the second data and a second command from a user.

16. A non-transitory computer readable storage device comprising instructions stored thereon that, when executed by a machine, configure the machine to perform an operation comprising:

receiving data indicating a plurality of workflow activities to be used in an application comprising a plurality of application states, wherein respective workflow activities of the plurality of workflow activities are associated with respective application states of the plurality of application states, and wherein each of the workflow activities comprises data corresponding to a configuration of a view model module and a list of views to be associated with the configuration of the view model module;

receiving data indicating a plurality of separate and independent user interface views to associate with each of the workflow activities;

receiving data indicating a connection between two of the workflow activities of the plurality of workflow activities;

producing an application model based on the received data indicating the plurality of workflow activities, the data indicating the connection between the two of the workflow activities and the data indicating the plurality of separate and independent user interface views; and configuring the application so that the application is executable by a processor for causing:

a first view of the list of views to persist and to remain synchronized across a plurality of user interfaces, in response to an application state change of the application, and a second view of the list of views to change, in response to the same application state change of the application, wherein the first view comprises a highlighted portion to indicate the change in the second view in response to the application state change.

17. The non-transitory computer readable storage device of claim 16, further comprising instructions that, when executed by the machine, configure the machine to perform an operation comprising receiving data indicating the first view to be associated with a first workflow activity of the plurality of workflow activities and receiving data indicating the second view to be associated with the first workflow activity such that the first view and the second view are presented simultaneously in response to the first workflow activity being performed.

18. The non-transitory computer readable storage device of claim 17, wherein the first workflow activity comprises a voice dialogue view and a visual view, and wherein the instructions further comprise instructions that, when executed by the machine, configure the machine to perform an operation comprising receiving data indicating a dialog to be associated with the voice dialogue view and receiving data indicating a text or a graphic to be associated with the visual view.

19. The non-transitory computer readable storage device of claim 18, wherein the voice dialogue view persists through the application state change, while the visual view changes in response to the application state change and the application state changes in response to a change of the visual view.

* * * * *